United States Patent
Peterson et al.

(10) Patent No.: US 12,453,480 B2
(45) Date of Patent: Oct. 28, 2025

(54) SYSTEMS AND METHODS FOR ASSESSING AND TREATING HEMORRHAGE AND OTHER CONDITIONS

(71) Applicant: REGENTS OF THE UNIVERSITY OF MINNESOTA, Minneapolis, MN (US)

(72) Inventors: Gregory Kermit Peterson, Centerville, MN (US); Elizabeth Rose Lusczek, St. Paul, MN (US); Gregory Joseph Beilman, Richfield, MN (US); Kristine Elizabeth Mulier, Vadnais Heights, MN (US); Philippe Pierre Joseph Buhlmann, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 407 days.

(21) Appl. No.: 16/860,529

(22) Filed: Apr. 28, 2020

(65) Prior Publication Data

US 2020/0337566 A1    Oct. 29, 2020

Related U.S. Application Data

(60) Provisional application No. 62/840,207, filed on Apr. 29, 2019.

(51) Int. Cl.
*A61B 5/0205* (2006.01)
*A61B 5/00* (2006.01)
(Continued)

(52) U.S. Cl.
CPC ........ *A61B 5/02042* (2013.01); *A61B 5/0205* (2013.01); *A61B 5/082* (2013.01);
(Continued)

(58) Field of Classification Search
CPC ... A61B 5/02042; A61B 5/0205; A61B 5/082; A61B 5/14546; A61B 5/208;
(Continued)

(56) References Cited

U.S. PATENT DOCUMENTS 5,704,368 A    1/1998  Asano et al.
5,834,626 A   11/1998  De Castro et al.
(Continued)

FOREIGN PATENT DOCUMENTS

EP    1764153    3/2007
EP    1806414    7/2007
(Continued)

OTHER PUBLICATIONS

Chen L, Reisner. Diagnosis of hemorrhage in a prehospital trauma population using linear and nonlinear multiparameter analysis of vital signs. Annu Int Conf IEEE Eng Med Biol Soc. 2007;2007:3748-51. doi: 10.1109/IEMBS.2007.4353147. PMID: 18002813. (Year: 2007).*

(Continued)

*Primary Examiner* — Alex M Valvis
*Assistant Examiner* — Grace L Rozanski
(74) *Attorney, Agent, or Firm* — Pauly, DeVries Smith & Deffner LLC

(57) ABSTRACT

Embodiments herein relate to systems, devices, and methods for assessing hemorrhage and other conditions and treating patients suffering from the same. In an embodiment, a method for detecting hemorrhage in a patient is included. The method can include obtaining a breath sample from the subject and contacting it with a chemical sensor element, the chemical sensor element including a plurality of discrete graphene varactors; sensing and storing capacitance of the discrete graphene varactors to obtain a sample data set; and classifying the sample data set into one or more preestablished hemorrhage classifications. Other embodiments are included herein.

17 Claims, 10 Drawing Sheets

(51) Int. Cl.
  *A61B 5/02* (2006.01)
  *A61B 5/021* (2006.01)
  *A61B 5/024* (2006.01)
  *A61B 5/08* (2006.01)
  *A61B 5/145* (2006.01)
  *A61B 5/20* (2006.01)
  *G01N 33/497* (2006.01)
  *G01N 33/50* (2006.01)

(52) U.S. Cl.
  CPC .......... *A61B 5/14546* (2013.01); *A61B 5/208* (2013.01); *A61B 5/7264* (2013.01); *G01N 33/497* (2013.01); *G01N 33/50* (2013.01); *A61B 5/021* (2013.01); *A61B 5/024* (2013.01); *A61B 5/0816* (2013.01); *G01N 33/4975* (2024.05)

(58) Field of Classification Search
  CPC . A61B 5/7264; A61B 5/021; A61B 5/024816; A61B 5/024; A61B 5/816; G01N 33/497; G01N 33/50; G01N 2033/4975
  See application file for complete search history.

(56) References Cited

U.S. PATENT DOCUMENTS

| | | | |
|---|---|---|---|
| 6,085,576 A | 7/2000 | Sunshine et al. | |
| 6,149,624 A | 11/2000 | Mcshane | |
| 6,192,168 B1 | 2/2001 | Feldstein et al. | |
| 6,248,078 B1 | 6/2001 | Risby et al. | |
| 6,312,390 B1 | 11/2001 | Phillips et al. | |
| 6,480,734 B1 | 11/2002 | Zhang et al. | |
| 6,599,253 B1 | 7/2003 | Baum et al. | |
| 6,712,770 B2 | 3/2004 | Lin et al. | |
| 6,726,637 B2 | 4/2004 | Phillips et al. | |
| 6,781,690 B2 | 8/2004 | Armstrong et al. | |
| 6,938,619 B1 | 9/2005 | Hickle | |
| 6,955,652 B1 | 10/2005 | Baum et al. | |
| 6,978,182 B2 | 12/2005 | Mazar et al. | |
| 7,032,431 B2 | 4/2006 | Baum et al. | |
| 7,123,359 B2 | 10/2006 | Armstrong et al. | |
| 7,177,686 B1 | 2/2007 | Turcott et al. | |
| 7,426,848 B1 | 9/2008 | Li et al. | |
| 7,459,312 B2 | 12/2008 | Chen et al. | |
| 7,704,214 B2 | 4/2010 | Meixner et al. | |
| 7,809,441 B2 | 10/2010 | Kane et al. | |
| 7,871,572 B2 | 1/2011 | Yang et al. | |
| 7,972,277 B2 | 7/2011 | Oki et al. | |
| 7,992,422 B2 | 8/2011 | Leddy et al. | |
| 8,043,860 B2 | 10/2011 | Leznoff et al. | |
| 8,080,206 B2 | 12/2011 | Leddy et al. | |
| 8,124,419 B2 | 2/2012 | Grigorian et al. | |
| 8,153,439 B2 | 4/2012 | Zamborini et al. | |
| 8,154,093 B2 | 4/2012 | Passmore et al. | |
| 8,157,730 B2 | 4/2012 | Tucker et al. | |
| 8,222,041 B2 | 7/2012 | Pearton et al. | |
| 8,366,630 B2 | 2/2013 | Haick et al. | |
| 8,481,324 B2 | 7/2013 | Nakhoul et al. | |
| 8,494,606 B2 | 7/2013 | Debreczeny et al. | |
| 8,529,459 B2 | 9/2013 | Stahl, Jr. et al. | |
| 8,597,953 B2 | 12/2013 | Haick et al. | |
| 8,747,325 B2 | 6/2014 | Bacal et al. | |
| 8,828,713 B2 | 9/2014 | Ren et al. | |
| 8,835,984 B2 | 9/2014 | Ren et al. | |
| 8,848,189 B2 | 9/2014 | Goldshtein et al. | |
| 8,955,367 B2 | 2/2015 | Gouma et al. | |
| 9,011,779 B1 | 4/2015 | Anglin, Jr. et al. | |
| 9,029,168 B2 | 5/2015 | Mannoor et al. | |
| 9,103,775 B2 | 8/2015 | Bradley et al. | |
| 9,147,851 B1 | 9/2015 | Bartsch et al. | |
| 9,315,848 B2 | 4/2016 | Haick et al. | |
| 9,316,637 B2 | 4/2016 | Ren et al. | |
| 9,324,825 B2 | 4/2016 | Ravesi et al. | |
| 9,357,946 B2 | 6/2016 | Johnson et al. | |
| 9,366,664 B2 | 6/2016 | Anglin, Jr. et al. | |
| 9,513,244 B2 | 12/2016 | Koester | |
| 9,618,476 B2 | 4/2017 | Goldsmith | |
| 9,643,186 B1 | 5/2017 | Ahmad et al. | |
| 9,765,395 B2 | 9/2017 | Goldsmith | |
| 10,070,804 B2 | 9/2018 | Eichler | |
| 10,191,005 B2 | 1/2019 | Koester | |
| 10,852,264 B2 | 12/2020 | Kelly et al. | |
| 11,143,662 B2 | 10/2021 | Edmonds et al. | |
| 11,166,636 B2 | 11/2021 | Erdman et al. | |
| 11,191,457 B2 | 12/2021 | Sherwood et al. | |
| 11,262,354 B2 | 3/2022 | Sherwood | |
| 11,442,056 B2 | 9/2022 | Peterson et al. | |
| 12,007,385 B2 | 6/2024 | Peterson et al. | |
| 2002/0123749 A1 | 9/2002 | Jain et al. | |
| 2002/0142477 A1 | 10/2002 | Lewis et al. | |
| 2003/0051733 A1 | 3/2003 | Kotmel et al. | |
| 2003/0060726 A1 | 3/2003 | Lin et al. | |
| 2003/0176804 A1 | 9/2003 | Melker | |
| 2005/0103343 A1 | 5/2005 | Gosweiler | |
| 2006/0130557 A1 | 6/2006 | Leddy et al. | |
| 2006/0263255 A1 | 11/2006 | Han et al. | |
| 2006/0270940 A1 | 11/2006 | Tsukashima et al. | |
| 2007/0048181 A1 | 3/2007 | Chang et al. | |
| 2007/0083094 A1 | 4/2007 | Colburn et al. | |
| 2007/0167853 A1 | 7/2007 | Melker et al. | |
| 2007/0229818 A1 | 10/2007 | Duan et al. | |
| 2008/0021339 A1 | 1/2008 | Gabriel et al. | |
| 2008/0146890 A1 | 6/2008 | Leboeuf et al. | |
| 2008/0183910 A1 | 7/2008 | Natoli et al. | |
| 2008/0227073 A1* | 9/2008 | Bardsley | G09B 23/34 434/267 |
| 2008/0317636 A1 | 12/2008 | Brahim et al. | |
| 2009/0054799 A1 | 2/2009 | Vrtis et al. | |
| 2009/0112115 A1 | 4/2009 | Huang et al. | |
| 2010/0024533 A1 | 2/2010 | Kimura et al. | |
| 2010/0081955 A1 | 4/2010 | Wood et al. | |
| 2010/0085067 A1 | 4/2010 | Gabriel et al. | |
| 2010/0087749 A1 | 4/2010 | Tovey | |
| 2010/0137733 A1 | 6/2010 | Wang et al. | |
| 2010/0188069 A1 | 7/2010 | Ren et al. | |
| 2010/0198521 A1 | 8/2010 | Haick et al. | |
| 2010/0216175 A1 | 8/2010 | Melker et al. | |
| 2010/0273665 A1 | 10/2010 | Haick et al. | |
| 2011/0015872 A1 | 1/2011 | Haick et al. | |
| 2011/0017587 A1 | 1/2011 | Zhamu et al. | |
| 2011/0092839 A1 | 4/2011 | Alshaer et al. | |
| 2011/0143962 A1 | 6/2011 | Chaubron et al. | |
| 2011/0238319 A1 | 9/2011 | Adamko et al. | |
| 2011/0269632 A1 | 11/2011 | Haick et al. | |
| 2011/0283770 A1 | 11/2011 | Hok et al. | |
| 2012/0111093 A1 | 5/2012 | Brahim et al. | |
| 2012/0126111 A1 | 5/2012 | Chaubron et al. | |
| 2012/0156099 A1 | 6/2012 | Zhong et al. | |
| 2012/0166095 A1 | 6/2012 | Potyrailo et al. | |
| 2012/0203081 A1 | 8/2012 | Leboeuf et al. | |
| 2012/0226111 A1 | 9/2012 | Leboeuf et al. | |
| 2012/0226112 A1 | 9/2012 | Leboeuf et al. | |
| 2012/0245434 A1 | 9/2012 | Haick et al. | |
| 2012/0245854 A1 | 9/2012 | Haick et al. | |
| 2012/0289838 A1 | 11/2012 | Varga et al. | |
| 2012/0326092 A1 | 12/2012 | Haick et al. | |
| 2013/0006068 A1 | 1/2013 | Gemer et al. | |
| 2013/0034190 A1 | 2/2013 | Tan et al. | |
| 2013/0034910 A1 | 2/2013 | Haick et al. | |
| 2013/0059758 A1 | 3/2013 | Haick et al. | |
| 2013/0060157 A1 | 3/2013 | Beard | |
| 2013/0102018 A1 | 4/2013 | Schentag et al. | |
| 2013/0143247 A1 | 6/2013 | Haick et al. | |
| 2013/0150261 A1 | 6/2013 | Haick et al. | |
| 2013/0171733 A1 | 7/2013 | Haick et al. | |
| 2013/0211207 A1 | 8/2013 | Joseph et al. | |
| 2013/0211852 A1 | 8/2013 | Roizen et al. | |
| 2013/0236981 A1 | 9/2013 | Haick et al. | |
| 2013/0253358 A1 | 9/2013 | Phillips et al. | |
| 2013/0266668 A1* | 10/2013 | Safo | A61K 31/665 424/712 |
| 2013/0289368 A1 | 10/2013 | Covington et al. | |

(56) References Cited

U.S. PATENT DOCUMENTS

| | | | |
|---|---|---|---|
| 2013/0296823 A1* | 11/2013 | Melker | A61M 5/16854 604/503 |
| 2013/0334579 A1 | 12/2013 | Accardi et al. | |
| 2014/0018691 A1 | 1/2014 | Mcneill et al. | |
| 2014/0039206 A1* | 2/2014 | Jonsson | C11C 1/10 549/413 |
| 2014/0051956 A1 | 2/2014 | Dalene et al. | |
| 2014/0066800 A1 | 3/2014 | Takatori et al. | |
| 2014/0145735 A1 | 5/2014 | Koester et al. | |
| 2014/0275597 A1 | 9/2014 | Zhang et al. | |
| 2014/0294675 A1 | 10/2014 | Melker et al. | |
| 2014/0330154 A1 | 11/2014 | Haveri | |
| 2014/0364758 A1 | 12/2014 | Schindhelm et al. | |
| 2015/0004169 A1 | 1/2015 | Kayed | |
| 2015/0013429 A1 | 1/2015 | Atkin et al. | |
| 2015/0038378 A1 | 2/2015 | Cheng et al. | |
| 2015/0044710 A1 | 2/2015 | Dasgupta et al. | |
| 2015/0065365 A1 | 3/2015 | Ahmad | |
| 2015/0065901 A1 | 3/2015 | Bhatnagar et al. | |
| 2015/0105683 A1 | 4/2015 | Bos | |
| 2015/0132858 A1* | 5/2015 | Ahmad | A61B 5/082 436/130 |
| 2015/0217075 A1 | 8/2015 | Nair | |
| 2015/0257676 A1 | 9/2015 | Fries | |
| 2015/0307936 A1 | 10/2015 | Goldsmith | |
| 2015/0309018 A1 | 10/2015 | Goldsmith | |
| 2015/0335266 A1 | 11/2015 | Cormier | |
| 2015/0338390 A1* | 11/2015 | Anglin, Jr. | G01N 27/227 73/23.3 |
| 2016/0025675 A1 | 1/2016 | Goldsmith | |
| 2016/0054312 A1 | 2/2016 | Goldsmith | |
| 2016/0109440 A1 | 4/2016 | Sherwood | |
| 2016/0116431 A1 | 4/2016 | Accardi et al. | |
| 2016/0231309 A1 | 8/2016 | Ahmad et al. | |
| 2016/0296168 A1 | 10/2016 | Abreu | |
| 2017/0014043 A1 | 1/2017 | Mcdonnell | |
| 2017/0035326 A1 | 2/2017 | King-Smith | |
| 2017/0042435 A1 | 2/2017 | Vermeulen et al. | |
| 2017/0050057 A1 | 2/2017 | Sabolis et al. | |
| 2017/0053068 A1 | 2/2017 | Pillai et al. | |
| 2017/0074857 A1 | 3/2017 | Dennis et al. | |
| 2017/0105656 A1 | 4/2017 | Rigas | |
| 2017/0251952 A1 | 9/2017 | Harshman et al. | |
| 2017/0254817 A1 | 9/2017 | Grafman et al. | |
| 2017/0303822 A1 | 10/2017 | Allsworth et al. | |
| 2017/0307562 A1 | 10/2017 | Goldsmith | |
| 2017/0307576 A1 | 10/2017 | Anglin, Jr. et al. | |
| 2017/0360337 A1 | 12/2017 | Sherwood et al. | |
| 2017/0361599 A1 | 12/2017 | Lerner et al. | |
| 2017/0365474 A1 | 12/2017 | Pan et al. | |
| 2017/0365477 A1 | 12/2017 | Pan et al. | |
| 2017/0365562 A1 | 12/2017 | Pan et al. | |
| 2018/0037952 A1 | 2/2018 | Goldsmith | |
| 2018/0037985 A1 | 2/2018 | Myers et al. | |
| 2018/0078798 A1 | 3/2018 | Fabian et al. | |
| 2018/0110444 A1 | 4/2018 | Sherwood et al. | |
| 2018/0172590 A1* | 6/2018 | Marsh | A61B 5/082 |
| 2018/0202993 A1 | 7/2018 | Molina et al. | |
| 2018/0228400 A1 | 8/2018 | Baba et al. | |
| 2018/0336970 A1 | 11/2018 | Sherwood et al. | |
| 2019/0025237 A1* | 1/2019 | Kelly | G01N 27/227 |
| 2019/0254538 A1 | 8/2019 | Erdman et al. | |
| 2019/0331661 A1 | 10/2019 | Zhen et al. | |
| 2019/0365283 A1* | 12/2019 | Chou | G01N 1/22 |
| 2020/0124588 A1 | 4/2020 | Peterson et al. | |
| 2020/0166435 A1 | 5/2020 | Sherwood et al. | |
| 2020/0178891 A1* | 6/2020 | Verbeck, IV | A61B 5/082 |
| 2020/0191737 A1 | 6/2020 | Sherwood et al. | |
| 2020/0200733 A1* | 6/2020 | Nolan | A61B 10/00 |
| 2021/0148848 A1* | 5/2021 | Kelly | G01N 33/497 |
| 2022/0125325 A1 | 4/2022 | Erdman et al. | |
| 2023/0184741 A1 | 6/2023 | Peterson et al. | |

FOREIGN PATENT DOCUMENTS

| | | |
|---|---|---|
| EP | 3093653 | 11/2016 |
| EP | 3431977 | 1/2019 |
| GB | 201402809 | 4/2014 |
| GB | 2523180 | 8/2015 |
| JP | 2011102747 | 5/2011 |
| WO | 9920177 | 4/1999 |
| WO | 9947905 | 9/1999 |
| WO | 2001070114 | 9/2001 |
| WO | 2008088780 | 7/2008 |
| WO | 2009135070 | 11/2009 |
| WO | 2012059763 | 5/2012 |
| WO | 2013090999 | 6/2013 |
| WO | 2013095730 | 6/2013 |
| WO | 2013189502 | 12/2013 |
| WO | 2014193847 | 12/2014 |
| WO | 2015191558 | 12/2015 |
| WO | 2016064740 | 4/2016 |
| WO | 2016105464 | 6/2016 |
| WO | 2017218464 | 12/2017 |
| WO | 2018005791 | 1/2018 |
| WO | 2018075731 | 4/2018 |
| WO | 2018213564 | 11/2018 |
| WO | 2019164925 | 8/2019 |
| WO | 2020081834 | 4/2020 |
| WO | 2020223208 | 11/2020 |

OTHER PUBLICATIONS

Lexcen, Daniel R. PhD; Metabolomics classifies phase of care and identifies risk for mortality in a porcine model of multiple injuries and hemorrhagic shock. Journal of Trauma and Acute Care Surgery 73(2):p. S147-S155, Aug. 2012. | DOI: 10.1097/TA.0b013e3182609821 (Year: 2012).*

Alexander E. Makarevich, Dynamics of Intermediate Substrates of Carbohydrates Metabolism in Exhaled Breath Condensate During Copd Development, Chest, vol. 130, Issue 4, Supplement, 2006, p. 170S, ISSN 0012-3692, https://doi.org/10.1378/chest.130.4_MeetingAbstracts.170S-c. (Year: 2006).*

"Final Office Action," for U.S. Appl. No. 16/280,644 mailed Mar. 30, 2021 (17 pages).

"International Preliminary Report on Patentability," for PCT Application No. PCT/US2019/056766 mailed Apr. 29, 2021 (10 pages).

"Non-Final Office Action," for U.S. Appl. No. 16/280,644 mailed Feb. 24, 2021 (46 pages).

"Response to Communication pursuant to Rules 161(1) and 162 EPC," for European Patent Application No. 19711730.2 filed Apr. 12, 2021 (9 pages).

"Response to Non-Final Rejection," mailed on Feb. 24, 2021 for U.S. Appl. No. 16/280,644, submitted via EFS-Web on Mar. 18, 2021, 9 pages.

"Final Office Action," for U.S. Appl. No. 16/656,159 mailed Mar. 3, 2022 (17 pages).

"Notice of Allowance," for U.S. Appl. No. 16/656,159 mailed May 13, 2022 (11 pages).

"Response to Final Rejection," mailed on Mar. 3, 2022 for U.S. Appl. No. 16/656,159, submitted via EFS-Web on May 3, 2022, 11 pages.

"Response to Non-Final Rejection," mailed on Oct. 18, 2021 for U.S. Appl. No. 16/656,159, submitted via EFS-Web on Jan. 18, 2022, 15 pages.

"Response to Communication Pursuant to Rules 161(1) and 162 EPC," for European Patent Application No. 20725391.5 filed Jun. 9, 2022.

"Communication Pursuant to Article 94(3) EPC," for European Patent Application No. 19711730.2 mailed Aug. 27, 2021 (4 pages).

"Notice of Allowance," for U.S. Appl. No. 16/280,644 mailed Jul. 2, 2021 (8 pages).

"Response to Final Rejection," mailed on Mar. 30, 2021 for U.S. Appl. No. 16/280,644, submitted via EFS-Web on Jun. 18, 2021, 7 pages.

(56) References Cited

OTHER PUBLICATIONS

"10 Leading Causes of Death, United States," (NCIPC) NCfIPaC. Web-based Injury Statistics Query and Reporting System. https://webappa.cdc.gov/sasweb/ncipc/leadcause.html, as available on Feb. 23, 2018 (3 pages).
Arasaradnam, R. P. et al., "Review Article: Next Generation Diagnostic Modalities in Gastroenterology—Gas Phase Volatile compound biomarker detection," Alimentary Pharmacology and Therapeutics 2014; 39: 780-789 (10 pages).
Banoei, Mohammad M. et al., "Metabolomics and Biomarker Discovery in Traumatic Brain Injury," Journal of Neurotrauma, vol. 35, No. 16, Mar. 2018 (59 pages).
Boots, Agnes W. et al., "The Versatile Use of Exhaled Volatile Organic Compounds in Human Health and Disease," J. Breath Res. 6 (2012) 027108 (21 pages).
Chen, Liangyou et al., "Diagnosis of Hemorrhage in a Prehospital Trauma Population Using Linear and Nonlinear Multiparameter Analysis of Vital Signs," 2007 Annual International Conference of the IEEE Engineering and Medicine and Biology Society, Aug. 22, 2007 (4 pages).
Chinopoulos, Christos "Which way Does the Citric Acid Cycle Turn During Hypoxia? The Critical Role of α-Ketoglutarate Dehydrogenase Complex," Journal of Neuroscience Research 91:1030-1043 (2013), 14 pages.
Chouchani, Edward T. et al., "Ischaemic Accumulation of Succinate Controls Reperfusion Injury Through Mitochondrial ROS," Nature. 2014; 515 (7527):431-435 (author manuscript), 29 pages.
"Communication Pursuant to Article 94(3) EPC," for European Patent Application No. 18180455.0 mailed Feb. 11, 2019 (6 pages).
D'alessandro, Angelo et al., "Early Hemorrhage Triggers Metabolic Responses That Build Up During Prolonged Shock," Am J Physiol Regul Integr Comp Physiol 308: R1034-R1044, 2015 (11 pages).
D'alessandro, Angelo et al., "Plasma Succinate is a Predictor of Mortality in Critically Injured Patients," Journal of Trauma and Acute Care Surgery. 2017;83(3):491-495, Author manuscript (9 pages).
D'alessandro, Angelo et al., "Trauma/Hemorrhagic Shock Instigates Aberrant Metabolic Flux Through Glycolytic Pathways, as Revealed by Preliminary C-glucose Labeling Metabolomics," Journal of Translational Medicine 2015;13(1): 253 (14 pages).
Deen, David A. et al., "Graphene-Based Quantum Capacitance Wireless Vapor Sensors," IEEE Sensors Journal, vol. 14, No. 5, May 2014, pp. 1459-1466 (8 pages).
Droscher, S. et al., "Quantum Capacitance and Density of States of Graphene," Phys. Scr. T146 (2012) 014009, pp. 1-5 (5 pages).
Ebrish, M. A. et al., "Dielectric Thickness Dependence of Quantum Capacitance in Graphene Varactors with Local Metal Back Gates," Device Research Conference, 2012 (2 pages).
Ebrish, M. A. et al., "Operation of Multi-Finger Graphene Quantum Capacitance Varactors using Planarized Local Bottom Gate Electrodes," Applied Physics Letters, vol. 100, No. 14, Apr. 2012 (4 pages).
El Sayad, Mohamed et al., "Recent Advances of Hemorrhage Management in Severe Trauma," Emergency Medicine International, vol. 2014, Article ID 635956 (5 pages).
"European Search Report," for Dutch Patent Application No. 2019492 dated Apr. 12, 2018 (10 pages).
"European Search Report," for European Patent Application No. 18180455.0 mailed Dec. 3, 2018 (5 pages).
"FDC1004 4-Channel Capacitance-to-Digital Converter for Capacitive Sensing Solutions," Data Sheet SNOSCY5B Texas Instruments Aug. 2014—Revised 2015 (24 pages).
"FDC1004EVM User Guide," Literature No. SNAU163C, Texas Instruments August 2014—Revised Oct. 2016 (46 pages).
"First Office Action," for Chinese Patent Application No. 201580056417.2 mailed Feb. 11, 2019 (13 pages) with English summary.
Fisher, James P. et al., "Central Sympathetic Overactivity: Maladies and Mechanisms," Autonomic Neuroscience 148.1 (2009): 5-15 (11 pages).
Georgakilas, Vasilios et al., "Functionalization of Graphene: Covalent and Non-Covalent Approaches, Derivatives and Applications," Chemical Reviews, 2012, 14:112(11), pp. 6156-6214.
Goolsby, Craig et al., "Just-in-Time to Save Lives: A Pilot Study of Layperson Tourniquet Application," Academic Emergency Medicine, 2015;22(9):1113-1117 (5 pages).
Gutierrez, Guillermo et al., "Clinical Review: Hemorrhagic Shock," Critical Care 2004, 8:373-381 (9 pages).
Hill, Lisa J. et al., "Cystain D (CST5): An Ultra-Early Inflammatory Biomarker of Traumatic Brain Injury," Sci Rep. Jul. 10, 2017;7(1):5002 (10 pages).
Howard, JT et al., "Reexamination of a Battlefield Trauma Golden Hour Policy," Journal of Trauma and Acute Care Surgery 2018;84(1): 11-18, Abstract only (2 pages).
Hu, Yuhai et al., "Chemically Functionalized Graphene and Their Applications in Electrochemical Energy Conversion and Storage," Advances in Graphene Science, Chapter 7, 2013, pp. 161-190 (30 pages).
"International Preliminary Report on Patentability," for PCT Application No. PCT/US2015/056243 mailed May 4, 2017 (8 pages).
"International Preliminary Report on Patentability," for PCT Application No. PCT/US2018/037144 mailed Dec. 27, 2018 (7 pages).
"International Preliminary Report on Patentability," for PCT Application No. PCT/US2019/081744 mailed Sep. 3, 2020 (11 pages).
"International Search Report and Written Opinion," for PCT Application No. PCT/US2015/056243, mailed Jan. 26, 2016 (12 pages).
"International Search Report and Written Opinion," for PCT Application No. PCT/US2017/037144 mailed Oct. 6, 2017 (11 pages).
"International Search Report and Written Opinion," for PCT Application No. PCT/US2017/057318 mailed Feb. 6, 2018 (14 pages).
"International Search Report and Written Opinion," for PCT Application No. PCT/US2018/033166 mailed Oct. 2, 2018 (12 pages).
"International Search Report and Written Opinion," for PCT Application No. PCT/US2019/056766 mailed Mar. 17, 2020.
"International Search Report and Written Opinion," for PCT Application No. PCT/US2019/081744 mailed Jun. 28, 2019 (16 pages).
"International Search Report and Written Opinion," for PCT Application No. PCT/US2020/030223 mailed Jul. 27, 2020 (17 pages).
"Invitation to Pay Additional Fees and, Where Applicable, Protest Fee," for PCT Application No. PCT/US2019/018744 mailed May 7, 2019 (11 pages).
Kauvar, David S. et al., "Impact of Hemorrhage on Trauma Outcome: An Overview of Epidemiology, Clinical Presentations, and Therapeutic Considerations," Journal of Trauma and Acute Care Surgery, 2006;60(6): S3-S11 (9 pages).
Koester, Steven J. "Using the Quantum Capacitance in Graphene to Enable Varactors for Passive Wireless Sensing Applications," 2011 IEEE Sensors Proceedings, pp. 994-997, 2011 (4 pages).
Kotwal, Russ S. et al., "Eliminating Preventable Death on the Battlefield," Archives of Surgery 2011;146(12): 1350-1358 (9 pages).
Krausz, Michael M. "Initial Resuscitation of Hemorrhagic Shock," World Journal of Emergency Surgery 2006, 1:14 (5 pages).
Lexcen, D. R. et al., "Metabolomics Classifies Phase of Care and Identifies Risk for Mortality in a Porcine Model of Multiple Injuries and Hemorrhagic Shock," Journal of Trauma and Acute Care Surgery 2012;73(2):S147-S155, Abstract only (2 pages).
Li, Xiao et al., "Digital Health: Tracking Physiomes and Activity Using Wearable Biosensors Reveals Useful Health-Related Information," PLoS Biology 15.1 (2017): e2001402 (30 pages).
Lusczek, Elizabeth R. et al., "Assessment of Key Plasma Metabolites in Combat Casualties," Journal of Trauma and Acute Care Surgery. 2017;82(2):309-316 (8 pages).
Ma, Rui et al., "Acetone Sensing Using Graphene Quantum Capacitance Varactors," 2016 IEEE Sensors, Orlando, FL, 2016 (3 pages).
Magera, Mark J. et al., "Methylmalonic Acid Measured in Plasma and Urine by Stable-Isotope Dilution and Electrospray Tandem Mass Spectrometry," Clin Chem. Nov. 2000;46(11):1804-10 (7 pages).
"Mechanical Data," DGS (S-PDSO-G10) DSC0010B Package Outline, Example Board Layout, and Stencil Design. Texas Instruments 2016 (5 pages).

(56) References Cited

OTHER PUBLICATIONS

Murphy, Michael P. et al., "Krebs Cycle Reimagined: The Emerging Roles of Succinate and Itaconate as Signal Transducers," Cell, vol. 174, Issue 4, Aug. 9, 2018, pp. 780-784 (5 pages).
Nakhleh, Morad K. et al., "Diagnosis and Classification of 17 Diseases from 1404 Subjects via Pattern Analysis of Exhaled Molecules," ACS Nano 2017, 11, 112-125 (14 pages).
"Nano Mobile Healthcare Inc.," Company Profile on Reuters.com URL <http://www.reuters.com/finance/stocks/companyProfile?symbol=VNTH.PK> accessed Mar. 17, 2017 (2 pages).
Oprea, A. et al., "Integrated Temperature, Humidity and Gas Sensors on Flexible Substrates for Low-Power Applications," 007 IEEE Sensors, Atlanta, GA, 2007, pp. 158-161 (4 pages).
"Package Materials Information," Tape and Reel Information and Box Dimensions. Texas Instruments Feb. 13, 2016 (2 pages).
"Package Option Addendum," Packaging Information for FDC1004DGSR, DGST, DSCJ, DSCR and DSCT Devices. Texas Instruments May 2015 (2 pages).
"Partial File History," for U.S. Appl. No. 14/883,895, filed Nov. 15, 2015 to Feb. 5, 2020 (284 pages).
Rassaei, Liza et al., "Lactate Biosensors: Current Status and Outlook," Anal Bioanal Chem (2014) 406:123-137 (16 pages).
"Researchers Identify Inflammatory Biomarkers Indicating Brain Injury," University of Birmingham, posted Jul. 10, 2017 <https://www.birmingham.ac.uk/news/latest/2017/07/researchers-identify-inflammatory-biomarkers-indicating-brain-injury.aspx> (4 pages).
"Response to Communication Pursuant to Rules 161(1) and 162 EPC," for European Patent Application No. 15790739.5 filed with the EPO Dec. 8, 2017 (14 pages).
Russo, Matthew V. et al., "Inflammatory Neuroprotection Following Traumatic Brain Injury," Science. Aug. 19, 2016;353(6301):783-5 (4 pages).
Slaughter, Anne L. et al., "Glutamine Metabolism Drives Succinate Accumulation in Plasma and the Lung During Hemorrhagic Shock," Journal of Trauma and Acute Care Surgery. 2016;81(6):1012-1019 (8 pages).
"Standard Terms and Conditions for Evaluation Modules," Texas Instruments 2016 (5 pages).
Stewart, Ian J. et al., "The Potential Utility of Urinary Biomarkers for Risk Prediction in Combat Casualties: A Prospective Observational Cohort Study," Critical Care 2015;19(1):252 (8 pages).
Tripathi, Kumud M. et al., "Recent Advances in Engineered Graphene and Composites for Detection of Volatile Organic Compounds (VOCs) and Non-Invasive Diseases Diagnosis," Carbon 110 (2016)97-129 (34 pages).
Umbrello, Michele et al., "The Key Role of Nitric Oxide in Hypoxia: Hypoxic Vasodilation and Energy Supply-Demand Matching," Antioxidants and Redox Signaling, vol. 19, No. 14, Nov. 10, 2013 (22 pages).
Wang, David "FDC1004: Basics of Capacitive Sensing and Applications," Application Report SNOA927, Texas Instruments Dec. 2014 (12 pages).
Witowski, Nancy E. et al., "Metabolomic Analysis of Survival in Carbohydrate Pre-Fed Pigs Subjected to Shock and Polytrauma," Molecular BioSystems Apr. 2, 20166; 12(5), 34 pages.
Woodcock, Thomas et al., "The Role of Markers of Inflammation in Traumatic Brain Injury," Front Neurol. Mar. 4, 2013;4:18 (18 pages).
"International Preliminary Report on Patentability," for PCT Application No. PCT/US2020/030223 mailed Nov. 11, 2021 (11 pages).
"Non-Final Office Action," for U.S. Appl. No. 16/656,159 mailed Oct. 18, 2021 (52 pages).
"Response to Communication Pursuant to Article 94(3) EPC," for European Patent Application No. 19711730.2 filed Dec. 8, 2021 (8 pages).
"Response to Communication Pursuant to Rules 161(1) and 162 EPC," for European Patent Application No. 19798812.4 filed Dec. 8, 2021 (10 pages).
Emam, Shadi et al. "A Molecularly Imprinted Electrochemical Gas Sensor to Sense Butylated Hydroxytoluene in Air," Journal of Sensors, vol. 18, article ID 3437149, May 9, 2018, pp. 1-9 (10 pages).
"Extended European Search Report," for European Patent Application No. 22189298.7 mailed Dec. 12, 2022 (11 pages).
Doran, Sophie L.F., et al. "Optimisation of sampling parameters for standardised exhaled breath sampling," Journal of Breath Research, vol. 12, No. 1, Dec. 6, 2017 (12 pages).
"First Office Action," for Chinese Patent Application No. 201980014220.0 mailed Feb. 9, 2023 (14 pages) with English summary.
"Communication pursuant to Article 94(3) EPC," for European Patent Application No. 20725391.5 mailed Sep. 12, 2024 (7 pages).
"Response to Communication pursuant to Article 94(3) EPC," for European Patent Application No. 20725391.5 filed Jan. 7, 2025 (71 pages).
"First Office Action," for Chinese Patent Application No. 202080031802.2 mailed Nov. 16, 2023 (6 pages).
"Response to Final Rejection," mailed on Sep. 28, 2023, for U.S. Appl. No. 17/941,364, submitted via EFS-Web on Dec. 21, 2023, 11 pages.
"Non-Final Office Action," for U.S. Appl. No. 17/520,339 mailed Jun. 27, 2023 (49 pages).
"Non-Final Office Action," for U.S. Appl. No. 17/941,364 mailed May 15, 2023 (46 pages).
"Response to Non-Final Rejection," mailed on May 15, 2023, for U.S. Appl. No. 17/941,364, submitted via EFS-Web on Aug. 11, 2023, 15 pages.
"Final Office Action," for U.S. Appl. No. 17/520,339 mailed Oct. 10, 2023 (18 pages).
"Final Office Action," for U.S. Appl. No. 17/941,364 mailed Sep. 28, 2023 (23 pages).
"First Office Action," for Chinese Patent Application No. 201980068940.5 mailed Sep. 19, 2023 (8 pages) with English Summary.
"Response to Non-Final Rejection," mailed Jun. 27, 2023, for U.S. Appl. No. 17/520,339, submitted via EFS-Web on Sep. 27, 2023, 10 pages.
"Second Office Action," for Chinese Patent Application No. 201980014220.0 mailed Sep. 4, 2023 (11 pages) with English Summary.

* cited by examiner

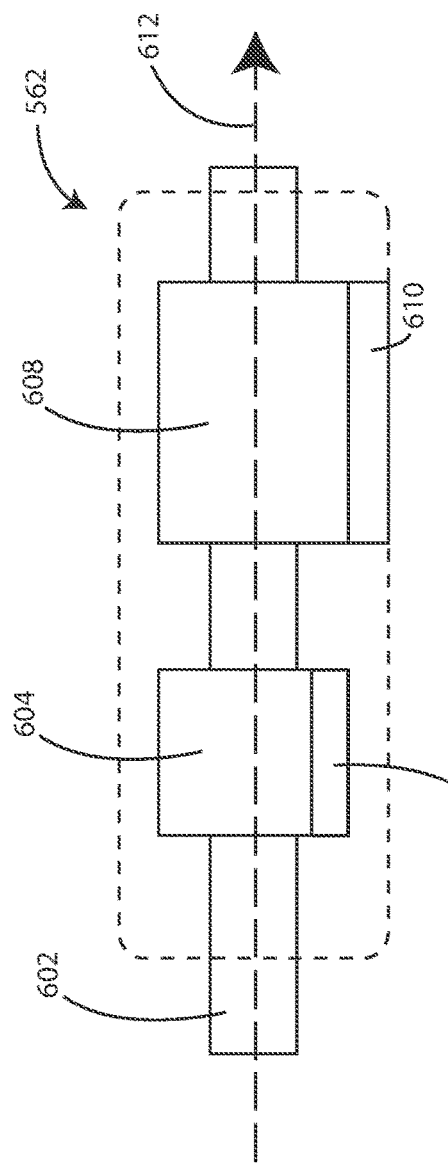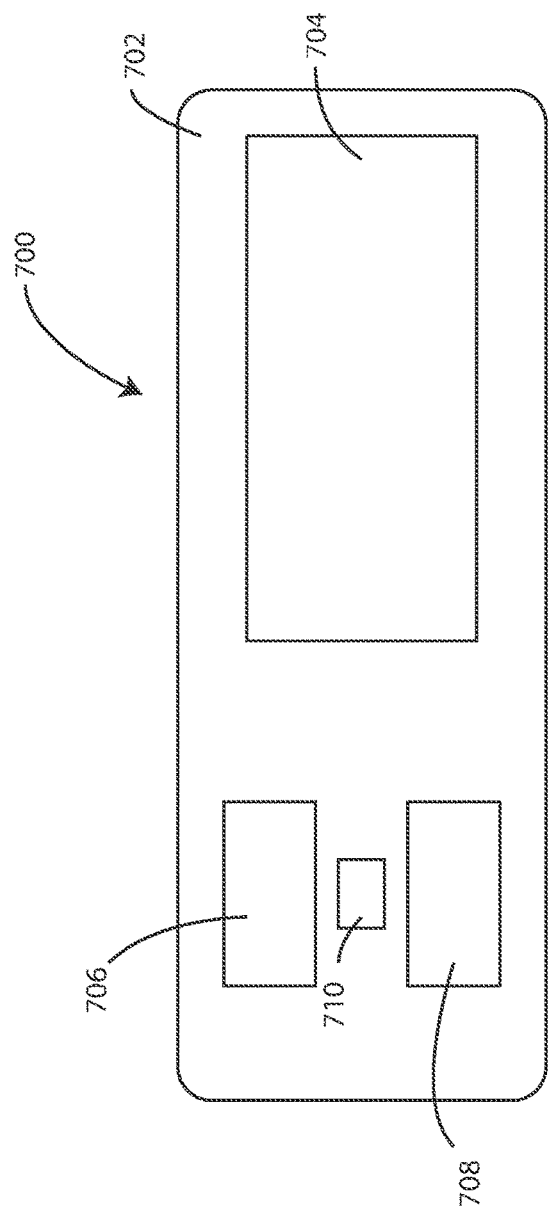

SYSTEMS AND METHODS FOR ASSESSING AND TREATING HEMORRHAGE AND OTHER CONDITIONS

This application claims the benefit of U.S. Provisional Application No. 62/840,207, filed Apr. 29, 2019, the content of which is herein incorporated by reference in its entirety.

FIELD

Embodiments herein relate to systems, devices, and methods for assessing hemorrhage and other conditions and treating patients suffering from the same.

BACKGROUND

The term hemorrhage describes blood loss which can include blood loss inside the body, called internal bleeding, or blood loss outside of the body, called external bleeding. Internal bleeding occurs when blood leaks out through a damaged blood vessel or organ. External bleeding happens when blood exits through a break in the skin or a natural opening in the body.

Hemorrhage can have various causes including a traumatic injury, a pre-existing medical condition, as a side-effect of various medications, and the like. However, regardless of cause, uncontrolled hemorrhage can result in various life-threatening conditions. Hemorrhage can lead to hemorrhagic shock, which is a condition characterized by reduced tissue perfusion, resulting in the inadequate delivery of oxygen that is necessary for cellular respiration. In the brain, hemorrhage can result in hemorrhagic stroke, which is a condition typically including bleeding from a ruptured blood vessel in or on the surface of the brain, with bleeding into the surrounding tissue.

The ability to detect the degree of hemorrhage in patients can lead to a more appropriate course of treatment for a patient as well as better triage when treating multiple patients. However, current detection methods for hemorrhage have various drawbacks. Some detection methods don't have sufficient specificity and/or sensitivity. Some detection methods are relatively slow and may not provide information until it is too late for the information to be useful in guiding care.

SUMMARY

In a first aspect, a method for detecting hemorrhage in a patient, is included, the method including obtaining a breath sample from the subject and contacting it with a chemical sensor element, the chemical sensor element including a plurality of discrete graphene varactors; sensing and storing capacitance of the discrete graphene varactors to obtain a sample data set; and classifying the sample data set into one or more preestablished hemorrhage classifications.

In a second aspect, in addition to one or more of the preceding or following aspects, or in the alternative to some aspects, the preestablished hemorrhage classifications can include Class I, Class II, Class III, and Class IV hemorrhage.

In a third aspect, in addition to one or more of the preceding or following aspects, or in the alternative to some aspects, the patient can be a trauma patient and/or a surgical patient.

In a fourth aspect, in addition to one or more of the preceding or following aspects, or in the alternative to some aspects, obtaining a breath sample from the subject can include obtaining a breath sample at least two times over a period of at least 10 minutes and the sample data set is further analyzed to determine an improvement or a worsening in the degree of hemorrhage.

In a fifth aspect, in addition to one or more of the preceding or following aspects, or in the alternative to some aspects, sensing and storing capacitance of the graphene varactors to obtain a sample data set can be performed across a range of bias voltages.

In a sixth aspect, in addition to one or more of the preceding or following aspects, or in the alternative to some aspects, organic compounds from the exhaled breath sample can interface with the discrete graphene varactors to influence sensed capacitance. In a seventh aspect, in addition to one or more of the preceding or following aspects, or in the alternative to some aspects, volatile organic compounds (VOCs) from the exhaled breath sample can interface with the discrete graphene varactors to influence sensed capacitance.

In an eighth aspect, in addition to one or more of the preceding or following aspects, or in the alternative to some aspects, a citric acid cycle compound from the exhaled breath sample can interface with the discrete graphene varactors to influence sensed capacitance.

In a ninth aspect, in addition to one or more of the preceding or following aspects, or in the alternative to some aspects, succinate from the exhaled breath sample can interface with the discrete graphene varactors to influence sensed capacitance.

In a tenth aspect, in addition to one or more of the preceding or following aspects, or in the alternative to some aspects, a reaction product of succinate from the exhaled breath sample and one or more reactants outside the body interfaces with the discrete graphene varactors to influence sensed capacitance.

In an eleventh aspect, in addition to one or more of the preceding or following aspects, or in the alternative to some aspects, a method can further include storing additional data regarding the subject beyond sensed capacitance as part of the sample data set that is classified.

In a twelfth aspect, in addition to one or more of the preceding or following aspects, or in the alternative to some aspects, a method can include sensing the patient's systolic blood pressure, wherein the systolic blood pressure forms part of the sample data set for classification.

In a thirteenth aspect, in addition to one or more of the preceding or following aspects, or in the alternative to some aspects, the additional data can include at least one of: prior traumatic injuries of the subject; the time elapsed since an injury to the subject; age of the subject; symptoms experienced by the subject; heart rate; respiratory rate; blood lactate concentration; urine output; volume of blood lost; percentage of blood lost; CNS symptoms; injury severity score; APACHE-II score; and Glasgow Coma score In a fourteenth aspect, in addition to one or more of the preceding or following aspects, or in the alternative to some aspects, the sample data set can be further analyzed to identify if the subject is a candidate for immediate fluid infusion or transport to a surgical facility.

In a fifteenth aspect, a method for detecting hemorrhage in a patient, is included, the method obtaining a breath sample from the subject; contacting the breath sample with a reactant, wherein the reactant reacts with succinate in the breath sample to form a reaction product, wherein the reaction product exhibits greater volatility than succinate; contacting the reaction product with a chemical sensor element, the chemical sensor element can include a plurality of discrete graphene varactors; sensing and storing capacitance of the discrete graphene varactors to obtain a sample data set; and classifying the sample data set into one or more preestablished hemorrhage classifications.

In a sixteenth aspect, in addition to one or more of the preceding or following aspects, or in the alternative to some aspects, a method can further include heating the breath sample in the presence of the reactant.

In a seventeenth aspect, in addition to one or more of the preceding or following aspects, or in the alternative to some aspects, a method can further include contacting the breath sample with the reactant in the presence of a catalyst.

In an eighteenth aspect, in addition to one or more of the preceding or following aspects, or in the alternative to some aspects, the reactant can be selected from the group consisting of a C1-C18 alcohol, an amine, and an anhydride, and the reaction product is selected from the group consisting of an ester, an amide, an imide, and an acid anhydride.

In a nineteenth aspect, in addition to one or more of the preceding or following aspects, or in the alternative to some aspects, a method can further include converting carboxylic acid groups into a more reactive group using a separate reagent prior to reaction with the reagent.

In a twentieth aspect, a method for detecting a state of hypoxia in a patient, is included, the method can include obtaining a breath sample from the subject and contacting it with a chemical sensor element, the chemical sensor element can include a plurality of discrete graphene varactors; sensing and storing capacitance of the discrete graphene varactors to obtain a sample data set; and classifying the sample data set into one or more preestablished hypoxia classifications.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which:

FIG. 6 is a schematic view of some components of a breath sensing device in accordance with various embodiments herein.

FIG. 7 a schematic plan view of a chemical sensor element in accordance with various embodiments herein.

Figure 1:
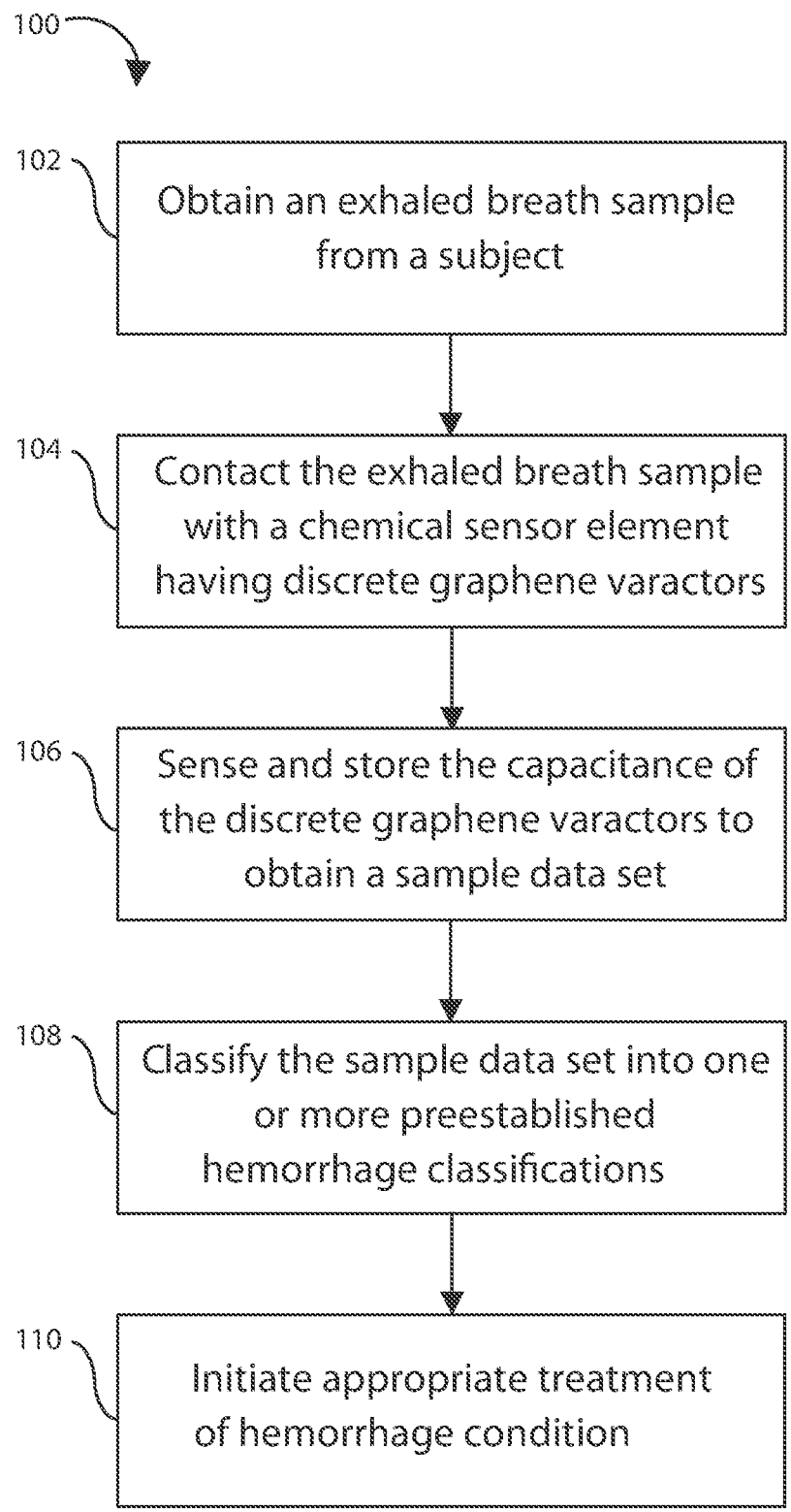
FIG. 1 is a schematic view of a method for assessing hemorrhage in a patient in accordance with various embodiments herein.
Figure 2:
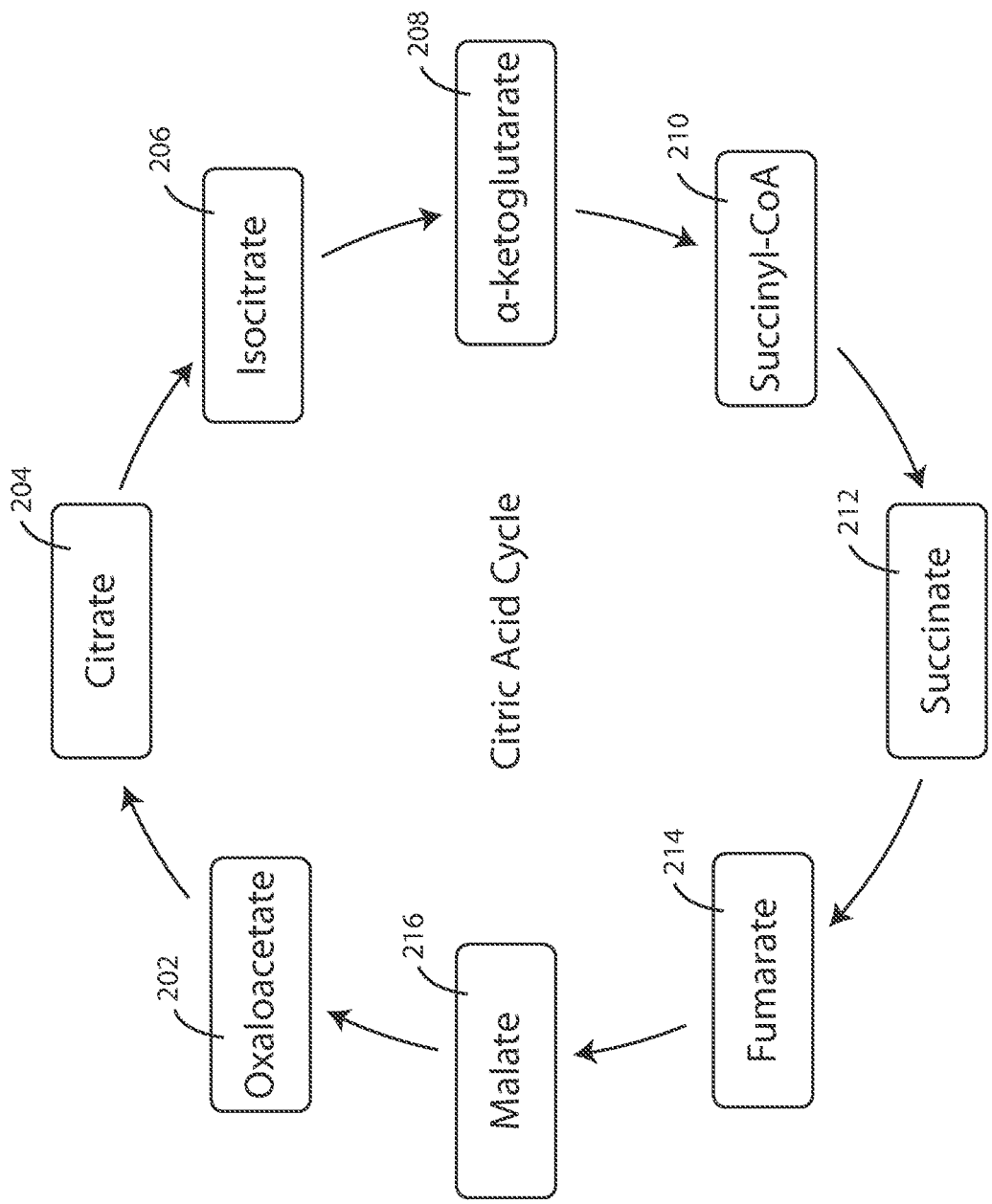
FIG. 2 is a schematic view of the citric acid cycle.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

As described above, the ability to rapidly detect the degree of hemorrhage in patients can lead to a more appropriate course of treatment for a patient as well as better triage when treating multiple patients. In accordance with embodiments herein, various organic compounds and/or patterns related to the same can be detected within the breath of a patient to aid in the detection of hemorrhage and/or as a part of methods of treating or caring for the same. In various embodiments, analysis of organic compounds can be performed in the field, beyond just in a care facility.

In some embodiments, detection of organic compounds and/or patterns related to the same can be monitored for a period of time to track changes (positive or negative) in a degree of hemorrhage experienced by a patient to provide guidance in adjusting a course of treatment as needed.

A degree of hemorrhage significant enough to result in hemorrhagic shock adversely impacts cellular respiration. When cellular respiration is impeded, certain organic compounds (such as succinate, amongst others) are increased in concentration because the mechanisms by which they are normally broken down (such as illustrated in the Citric Acid Cycle) are impeded. The kinetics of changes in concentration of such compounds is quite rapid (seconds to minutes) including rapid increases in response to the onset of hemorrhagic shock and rapid decreases in response to successful intervention. Therefore, in order to be clinically useful to guide care, a diagnostic test for hemorrhage must have a very fast response time.

In accordance with various embodiments herein, various organic compounds (including, but not limited to succinate, reaction products of succinate, and other compounds related to cellular respiration) and/or patterns related to the same can be detected within the breath of a patient and evaluated to provide an indication of the degree of hemorrhage extremely rapidly.

Similarly, hypoxic states also adversely impact cellular respiration. Hypoxia is oxygen deficiency at the tissue level. Similar to hemorrhage, hypoxic states can be assessed by detection of various organic compounds (including, but not limited to succinate, reaction products of succinate, and other compounds related to cellular respiration) and/or patterns related to the same within the breath of a patient.

In accordance with various embodiments herein, methods of detecting a state of hypoxia in a patient are included herein. A method for detecting a state of hypoxia in a patient can include operations of obtaining a breath sample from the subject and contacting it with a chemical sensor element, the chemical sensor element comprising a plurality of discrete graphene varactors. The method can further include sensing and storing capacitance of the discrete graphene varactors to obtain a sample data set and classifying the sample data set into one or more preestablished hypoxia classifications. Exemplary hypoxia classifications are described below.

Referring now to FIG. 1, a schematic view of a method 100 for assessing hemorrhage in a patient is shown in accordance with various embodiments herein. The method 100 for assessing hemorrhage can include obtaining an exhaled breath sample from the patient at 102 and contacting it with a chemical sensor element at 104. The chemical sensor element can include a plurality of discrete graphene varactors (that will be discussed below in reference to FIGS. 5-12). In some embodiments, the step of obtaining an exhaled breath sample from a patient can include obtaining a breath sample within 10 minutes following a traumatic injury. In other embodiments, the step of obtaining an exhaled breath sample from the patient comprises obtaining a breath sample at least two times over a period of 24 hours following a traumatic injury. In many embodiments the patient is a human. However, systems, devices and methods herein can also be usefully applied in veterinary contexts on animals including, but not limited to, cows, bison, pigs, sheep, goats, horses, dogs, cats, and chickens.

The step of obtaining a breath sample of a subject can be performed multiple times over a course of monitoring a patient. A breath sample can be obtained at various time points following the onset of a traumatic injury or other event resulting in a risk of hemorrhage.

The method 100 can also include sensing and storing capacitance of the discrete graphene varactors to obtain a sample data set at 106. The method 100 can include classifying the sample data set into one or more preestablished hemorrhage classifications at 108. The one or more preestablished hemorrhage classifications will be discussed in more detail below. In various embodiments, additional data regarding the subject beyond sensed capacitance can be stored and can be used as part of the sample data set that is classified. Examples of exemplary additional data are described in greater detail below.

In some embodiments, the method 100 can include analyzing the sample data set 110 to determine an improvement or a worsening in the degree of hemorrhage of the subject over 24 hours. In some embodiments, the method 100 can include analyzing the sample data set 110 to determine an improvement or a worsening in the degree of hemorrhage of the subject over 12 hours. In other embodiments, the method 100 can include analyzing the sample data set 110 to determine an improvement or a worsening in the degree of hemorrhage of the subject over 5 minutes to 24 hours or more. The sample data set can be further analyzed to identify if the subject is a candidate for fluid replacement therapy or another therapeutic intervention to treat hemorrhage.

The steps of methods herein (or operations executed by a device) can be executed rapidly. The steps of methods herein (or operations executed by a device) can be executed fast enough to be clinically useful in guiding care in a variety of settings. By way of example, in various embodiments, steps (or operations) 102-110 can be executed in less than 15, 13, 10, 8, 5, 4, 3, 2 or 1 minute, or can be executed in an amount of time falling within a range between any of the foregoing.

Sensing and storing capacitance of the graphene varactors to obtain a sample data set can be performed across a range of bias voltages. In some embodiments, the sensing and storing of capacitance of the graphene varactors can include sensing the capacitance from −3 V to 3 V. In some embodiments, the range of bias voltages can be from −2 V to 2 V. In other embodiments, the range of voltages can be from −1.5 V to 1.5 V. In some embodiments, the storing of capacitance of the graphene varactors can include sensing the capacitance at −3 V, −2.5 V, −2.0 V, −1.5 V, −1.0 V, −0.5 V, 0.5 V, 1.0 V, 1.5 V, 2.0 V, 2.5 V, 3.0 V. It will be appreciated that the sensing and storing of capacitance of the graphene varactors can include sensing the capacitance within a range, wherein any of the forgoing voltages can serve as the lower or upper bound of the range, provided that the lower bound of the range is a value less than the upper bound of the range.

The sensing and storing of capacitance of the graphene varactors across a range of bias voltages can include sensing the capacitance in a stepped fashion. Sensing and storing of capacitance in a stepped fashion can be performed at voltage intervals, such as every 5, 10, 25, 50, 75, 100, 125, 150, 200, 300, 400, or 500 mV, or by a stepped amount falling within a range between any of the foregoing.

When sensing and storing of capacitance of the graphene varactors across a range of bias voltages in a stepped fashion, a sample data set can be obtained at each bias voltage for each discrete graphene varactor. The sensing and storing of capacitance of the graphene varactors across a range of bias voltages to obtain a sample data set can include storing at least 5, 10, 20, 30, 40, 50, 60, 70, 80, 90, 100, 125, 150, 175, 200, 250, 300, 350, 400, 450, or 500 discrete capacitance values (or a number of discrete capacitance values falling within a range between any of the foregoing) for each graphene varactor across the range of bias voltages.

The methods herein can also include gathering and/or storing additional data regarding the subject beyond sensed capacitance as part of the sample data set that is classified. The additional data can include, but not be limited to prior traumatic injuries of the subject; the time elapsed since an event has occurred which created a risk of hemorrhage; age of the subject; symptoms experienced by the subject; and data regarding specific biomarkers of hemorrhage (including, but not limited to, heart rate, blood pressure, blood lactate concentration, urine output, etc.). In some cases, additional data can include biomarkers of hypoxia including, but not limited to, hypoxanthine and 2-hydroxybutyrate.

It will be appreciated that organic compounds from the exhaled breath sample of a subject can interface with the discrete graphene varactors to influence sensed capacitance. In particular, organic compounds, including those that are part of cellular respiration can interface with the graphene varactors to influence sensed capacitance. More specifically, organic compounds that are part of the citric acid cycle (including, but not limited to succinate) can interface with the graphene varactors to influence sensed capacitance.

Cellular respiration occurs in three major stages. In the first stage, organic fuel molecules (such as glucose, fatty acids, and some amino acids) are oxidized to yield two-carbon fragments in the form of the acetyl group of acetyl-coenzyme A (acetyl-CoA). In the second stage, these acetyl groups are fed into the citric acid cycle, which enzymatically oxidizes them to $CO_2$. The energy released by oxidation is conserved in the reduced electron carriers NADH and $FADH_2$. In the third stage of respiration, these reduced cofactors are themselves oxidized, giving up protons and electrons. The electrons are transferred along a chain of electron-carrying molecules, known as the respiratory chain, to $O_2$, which they reduce to form $H_2O$.

In the citric acid cycle, acetyl-CoA donates its acetyl group to the four-carbon compound oxaloacetate 202 to form the six-carbon citrate 204. Citrate 204 is then transformed into isocitrate 206, also a six-carbon molecule, which is dehydrogenated with loss of $CO_2$ to yield the five-carbon compound α-ketoglutarate 208. The latter undergoes loss of $CO_2$ to form succinyl-CoA 210 and then after substrate-level phosphorylation yields the four-carbon compound succinate 212. Succinate 212 is then converted to fumarate 214 in a dehydrogenation reaction. Fumarate 214 is converted to malate 216 in a hydration reaction. Malate 216 is then converted to oxaloacetate 202 in a dehydrogenation reaction. Oxaloacetate 202 can then react with another molecule of acetyl-CoA to start the cycle over again.

However, in significant hemorrhagic states such as hemorrhagic shock, the blood supply to tissues is restricted. The lack of oxygenated blood flowing to the tissue bed impedes the citric acid cycle and results in a buildup of various organic compounds related to cellular respiration. Therefore, the detection of the levels of organic compounds (in the absolute or relative to levels of other marker compounds) and/or patterns related to the same can provide an indication of the degree to which cellular respiration is impeded and therefore can provide an indication of the degree of hemorrhage being suffered by the patient.

In particular, it has been found that succinate levels are elevated in patients who are experiencing hemorrhage that is severe enough to interfere with cellular respiration. Thus, by testing a patient for levels of compounds related to cellular respiration and/or patterns related to the same, the degree of hemorrhage they are experiencing can quickly be assessed.

Figure 3:
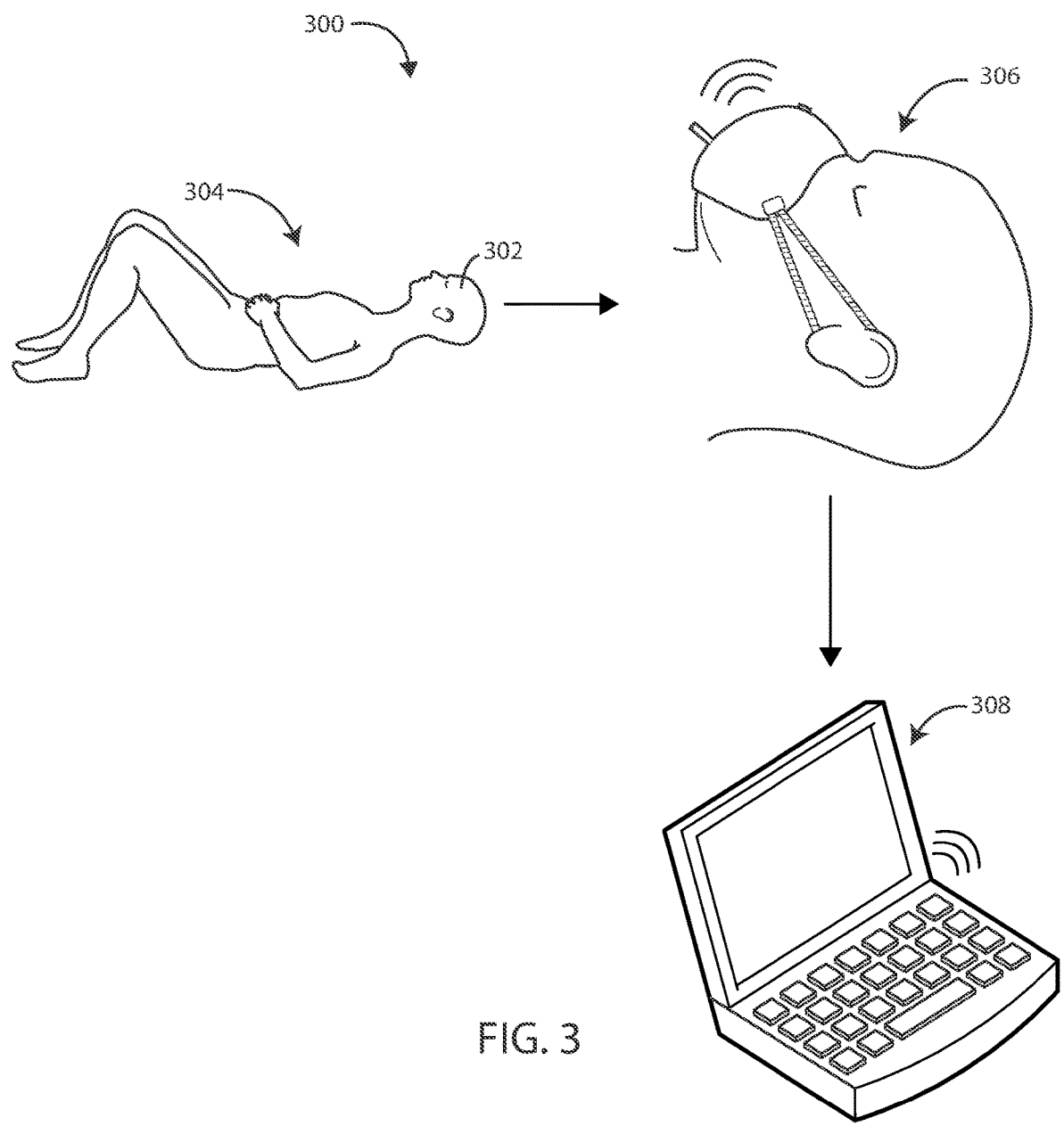
FIG. 3 is a schematic view of the assessment of hemorrhage in a patient in accordance with various embodiments herein.

By way of example, referring now to FIG. 3, a schematic view of a method 300 for detecting a degree of hemorrhage in a patient is shown in accordance with various embodiments herein. In FIG. 3, a subject 302 may have experienced a traumatic injury at 304. The traumatic injury could be a vehicular accident, a gunshot wound, a fall, a machinery accident, or anything else that can result in hemorrhage.

While FIG. 3 illustrates a scenario where hemorrhage is related to a traumatic injury (e.g., traumatic bleeding), it will be appreciated that hemorrhage may be also related to a medical condition (such as hemophilia, leukemia, liver disease, menorrhagia, thrombocytopenia, von Willebrand disease, vitamin K deficiency, lung cancer, and the like). Hemorrhage may also be related to or exacerbated by a therapeutic treatment used by or on the subject 302 (such as surgical or other medical procedures, blood-thinning medications, long-term antibiotic use, radiation therapy, aspirin, and the like).

An exhaled breath sample is obtained from the subject 302 and is contacted with a chemical sensor element containing a plurality of discrete graphene varactors at 306. Sensing and storing capacitance of the discrete graphene varactors to obtain a sample data set is shown at 308.

Figure 4:
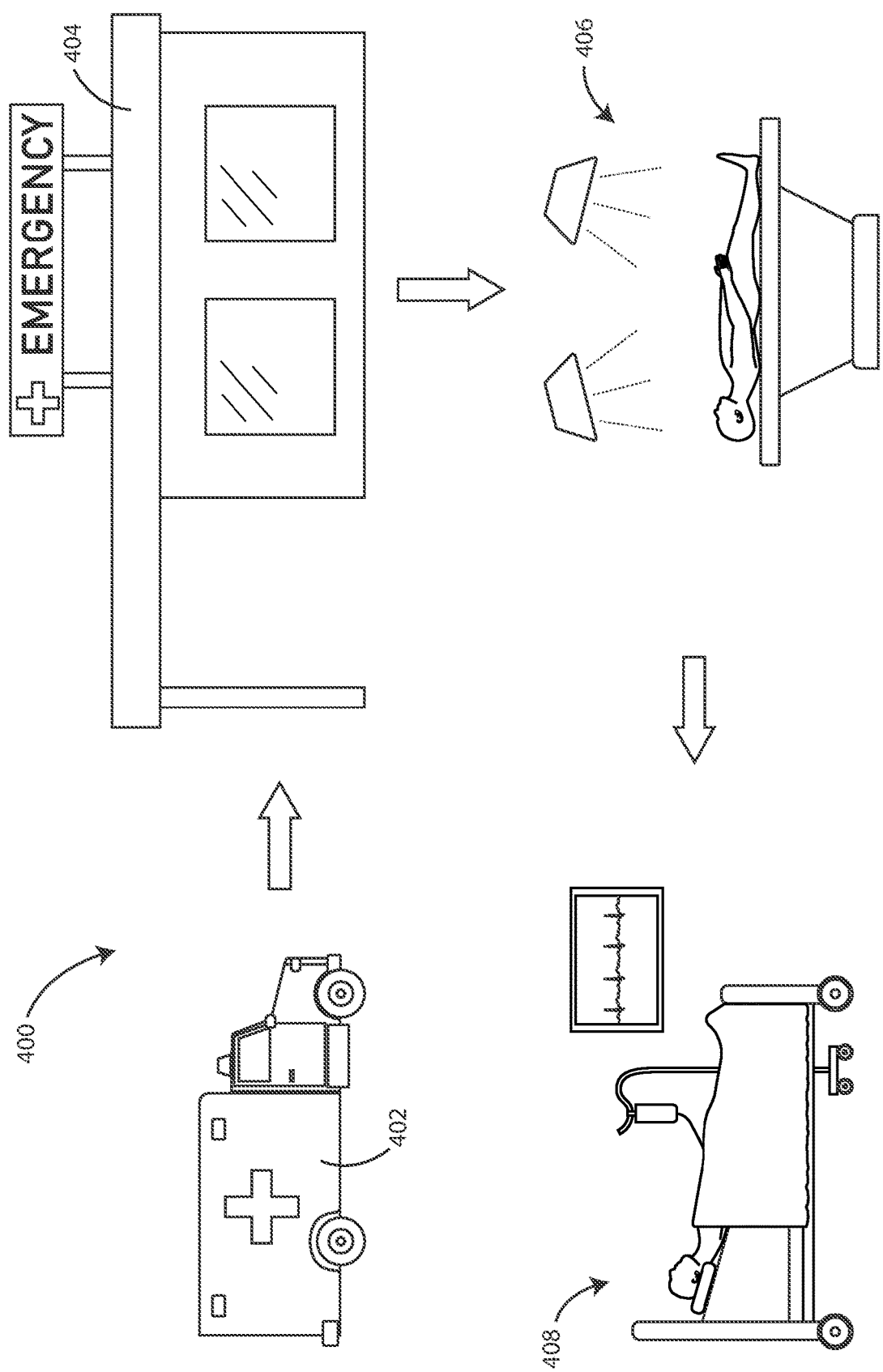
FIG. 4 is a schematic view of distinct stages in the care of a trauma victim in accordance with various embodiments herein.

Tests for hemorrhage can be performed at various stages of the overall patient care process. Referring now to FIG. 4, a schematic view of distinct stages in the care of a trauma victim in accordance with various embodiments herein. In many scenarios, the patient may be first assisted by a first responder 402 such as a paramedic, a firefighter, a police officer, a medic, or the like. In many cases, the first responder 402 will initially interface with the patient in the field, away from well-equipped medical facilities. The first responder 402 must try to stabilize the patient's condition. However, without knowing whether or not hemorrhage is occurring (and the extent of the same) it can be difficult to administer the best therapy for stabilization.

In accordance with embodiments herein, the first responder 402 can administer a test of the patient's breath (or another sample type) in order to rapidly assess the degree of hemorrhage the patient is suffering and can then administer appropriate therapy. By way of example, if the patient is tested for hemorrhage and the test results indicate significant hemorrhage, then the first responder 402 can introduce an intravenous line to begin the infusion of fluids (such as crystalloid solutions, colloid solutions, hypertonic saline, or oxygen-carrying blood substitutes).

Alternatively, if the test results do not indicate significant hemorrhage, then the first responder 402 may not take the time to introduce an intravenous line but may simply focus on securing an open airway and breathing and immediate evacuation to an emergency care facility 404. Further, it is important to not infuse too much fluid into the patient. Infusion of too much fluid can lead to fluid overload which can contribute to respiratory failure, heart failure, and kidney failure. Thus, if the test results do not indicate significant hemorrhage, then the first responder 402 may take precautions to not infuse too much fluid, if any.

The emergency care facility 404 typically has more diagnostic equipment than the first responder 402 as well as other medical equipment, therapeutic agents and skilled personnel not available in a first responder scenario. Thus, many therapies and interventions not available from a first responder 402 can be administered at an emergency care facility 404. However, before the appropriate therapy or intervention can be selected, the patient's condition must be determined. In accordance with embodiments herein, a care provider at an emergency care facility 404 can administer a test of the patient's breath (or another sample type) in order to rapidly assess the degree of hemorrhage the patient is suffering and can then administer appropriate therapy. Also, in accordance with embodiments herein, a care provider at an emergency care facility 404 can administer a test of the patient's breath (or another sample type) in order to rapidly assess the degree of hemorrhage the patient is suffering and then triage the patient appropriately.

Depending on the nature of the patient's injuries, they may be transferred to an operating room 406 for surgical interventions. In many cases, the surgical intervention can involve determining the source of hemorrhage and suturing, cauterizing, and otherwise stopping the further loss of blood. Surgical intervention may also involve steps of removing pooled blood, ensuring sufficient blood flow is reaching the organs and limbs, and removing foreign objects in some scenarios. However, only sources of blood loss that are identifiable can be treated. Further, with trauma victims, it can be difficult to know if all sources of blood loss have been identified.

However, it has been determined that succinate levels (and other organic compounds) rapidly return to more normal levels when sources of bleeding have been addressed. Thus, in accordance with various embodiments herein, a surgical team member in an operating room 406 can administer a test of the patient's breath (or another sample type) in order to rapidly assess the degree of hemorrhage the patient is suffering and can then administer appropriate therapy. In the specific context of a surgical patient, the test may be administered multiple times and the patient may be monitored for changes. If the tests indicate that levels of organic compounds, (such as succinate) have dropped or a detected pattern of organic compounds has returned to a normal pattern, then that can be taken as an indication that hemorrhage has stopped and the surgeon can move on to address other issues the patient has or can end further surgical intervention.

In addition, even outside the context of a trauma victim, hemorrhage can be a concern with surgical patients generally. For example, some patients may have bleeding issues associated with a preexisting medical condition such as anemia, vitamin K deficiency, liver failure, factor VIII deficiency or the like, medications causing excessive bleeding such as aspirin, warfarin, plavix, and the like, or other medically relevant factors. It can be important to monitor such patients for signs of hemorrhage in the context of a surgical procedure. Thus, in some embodiments herein, a surgical patient can be assessed for possible hemorrhage by administering a test as described herein.

After a surgical (or other) intervention, the patient may be taken to a recovery room 408 and/or to another close-care setting for close observation (such as an intensive care unit or the like). As discussed above, succinate levels (and levels of other organic compounds) will rapidly return to more normal levels when hemorrhaging has ceased. Conversely, succinate levels will rise quite rapidly when hemorrhaging begins or resumes. As such, there is value in periodically analyzing the patient's breath or another sample therefrom using techniques described herein to assess for possible hemorrhage. A rapid increase in succinate levels can be indicative of a patient that is decompensating in part due to hemorrhage.

In addition, patients in a recovery room 408 or an ICU or the like may periodically begin to decompensate and the reason for their decompensation may not always be immediately clear. It can be important to rule out hemorrhage as a reason for their sudden decompensation. In accordance with various embodiments herein, a decompensating patient can be tested using techniques described herein in order to determine whether or not hemorrhage is the cause (or a contributing factor) to their decompensation.

Figure 5:
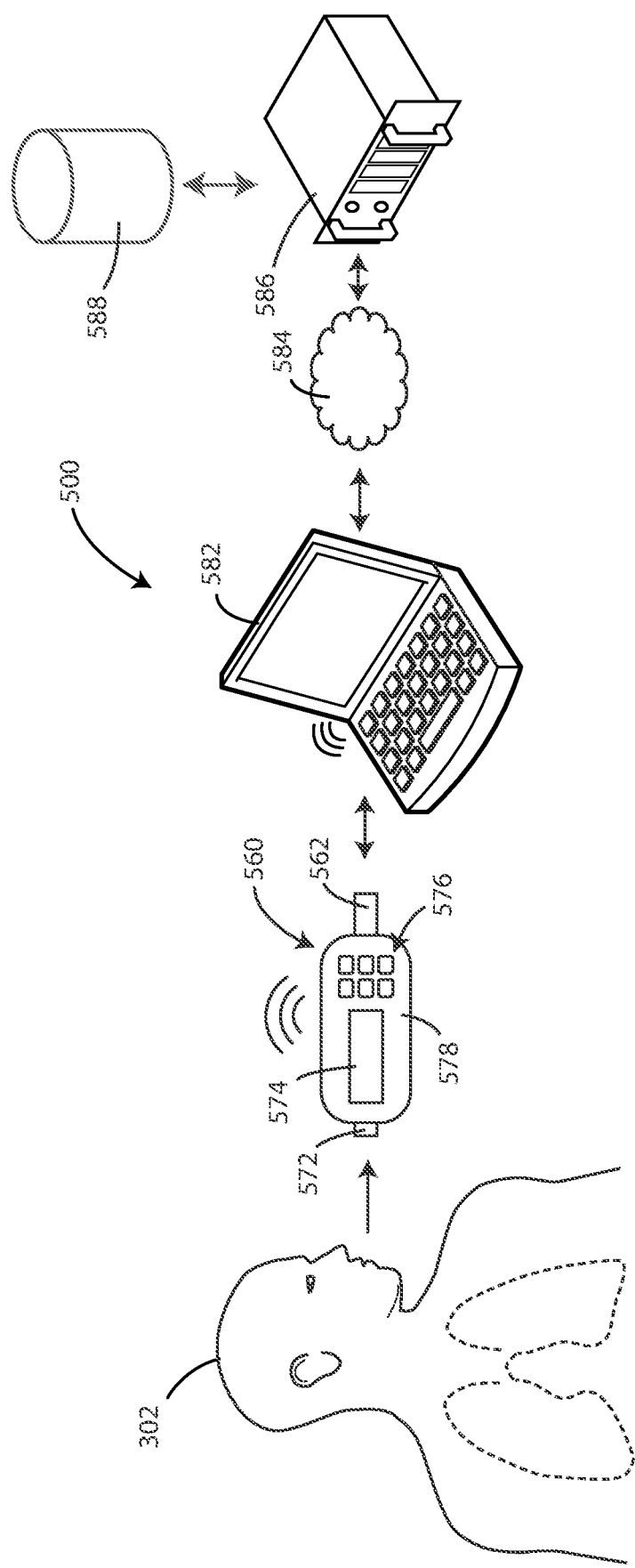
FIG. 5 is a schematic view of various components of a system in accordance with various embodiments herein.

Referring now to FIG. 5, a schematic view is shown of components of a system 500 in order to conduct testing in accordance with various embodiments herein. The system 500 can include a breath sensing device 560 for sensing volatile organic compounds in an exhaled breath sample of a subject 302 accordance with various embodiments herein. In this embodiment, the system is in a hand-held format that can be used in the field. It will be appreciated, however, that many other formats for the system are contemplated herein.

The breath sensing device 560 can include a housing 578. The breath sensing device 560 can include a mouthpiece 562 into which a subject to be evaluated can blow a breath sample. The breath sensing device 560 can also include a display screen 574 and a user input device 576, such as a keyboard. The breath sensing device 560 can also include a gas outflow port 572. Aspects of breath sensing systems and devices are described in U.S. Publ. Appl. No. 2016/0109440, the content of which is herein incorporated by reference. While FIG. 5 shows a breath sensing device, it will be appreciated that other types of gas sampling systems can also be used herein. For example, gas sampling devices for use with catheters and endoscopy systems can also be used. An exemplary gas sampling device in the context of a catheter or endoscopy device is described in U.S. Appl. No. 62/350,345, the content of which is herein incorporated by reference.

In some embodiments, the system 500 can include a local computing device 582 that can include a microprocessor, input and output circuits, input devices, a visual display, a user interface, and the like. In some embodiments, the breath sensing device 560 can communicate with the local computing device 582 in order to exchange data between the breath sensing device 560 and the local computing device 582. The local computing device 582 can be configured to perform various processing steps with the data received from the breath sensing device 560, including, but not limited to, calculating various parameters described herein. However, it should be appreciated that in some embodiments the features associated with the local computing device 582 can be integrated into the breath sensing device 560. In some embodiments, the local computing device 582 can be a laptop computer, a desktop computer, a server (real or virtual), a purpose dedicated computer device, or a portable computing device (including, but not limited to, a mobile phone, tablet, wearable device, etc.).

The local computing device 582 and/or the breath sensing device 560 can communicate with computing devices in remote locations through a data network 584, such as the Internet or another network for the exchange of data as packets, frames, or otherwise.

In some embodiments, the system 500 can also include a computing device such as a server 586 (real or virtual). In some embodiments, the server 586 can be located remotely from the breath sensing device 560. The server 586 can be in data communication with a database 588. The database 588 can be used to store various patient information, such as that described herein. In some embodiments, the database can specifically include an electronic medical database containing data regarding the health status of a patient, patterns of data associated with various conditions (such as that generated from machine learning analysis of large sets of patient data), demographic data and the like. In some embodiments, the database 588 and/or server 586, or a combination thereof, can store the data generated by the chemical sensor(s) as well as data output generated by machine learning analysis.

In various embodiments herein, a breath sample of the patient can be treated to one or more pretreatment steps before contacting it with a chemical sensor element, the chemical sensor element including a plurality of discrete graphene varactors. By way of example, the breath sample can be heated, cooled, humidified, dehumidified, filtered, volatilized, chemically modified, and the like. In some particular embodiments, components within the breath sample can be reacted with various reagents in order to produce compounds with greater volatility and that may be more readily sensed by chemical sensor elements including graphene varactors as described herein.

Referring now to FIG. 6, a schematic view is shown of some components of a breath sensing device 560 in accordance with various embodiments herein. The breath sensing device 560 can include a main flow channel 602 (which can be attached to a mouthpiece and other components) which directs the breath of the patient through the device 560 in the direction of arrow 612.

The breath can enter a pretreatment chamber 604. In some embodiments, the pretreatment chamber 604 can include a heating element 606. In some embodiments, the pretreatment chamber 604 may include packed, porous media that can accomplish various purposes. In some embodiments, the media can serve a filtration function. In some embodiments, the pretreatment chamber 604 can include a desiccant.

After the pretreatment chamber 604 the gas sample can pass to a sensor chamber 608 containing graphene varactors. In some embodiments, control circuitry 610 (including measurement circuitry as described with reference to FIGS. 10-11 herein) can control operations of the breath sending device 560 including measurement operations described herein.

In some embodiment, the media in the pretreatment chamber 604 may be impregnated with a reactant that can react with certain components of the breath in order to generate species that are more volatile than the starting compounds and therefore more easily detected by the graphene varactors.

For example, a reaction product of succinate can be formed that exhibits greater volatility than succinate. Volatility is directly related to a substance's vapor pressure. At a given temperature, a substance with higher vapor pressure vaporizes more readily than a substance with a lower vapor pressure. Succinate has a vapor pressure of $1.91\times10^{-7}$ mmHg (at 25° C.), meaning that, relatively speaking, it does not vaporize very readily. The structure of succinate is shown below:

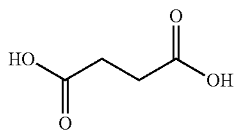

In accordance with various embodiments herein, succinate can be reacted with a selected reactant in order to generate a reaction product that vaporized much more readily than succinate and as a reaction product of succinate is reflective of succinate concentrations in the breath sample of the patient. In various embodiments, a catalyst can be used in the reaction.

In some embodiments, the carboxylic acid groups of succinate can be targeted for reaction with a selected reactant. As one example, an alcohol can react with the carboxylic acid group, in absence or presence of a catalyst (such as an acid) or a sacrificial reagent (such as a carbodiimide reagent), forming an ester. Dimethyl succinate has a vapor pressure of 0.46 mmHg (at 25° C.), meaning that it much more volatile than succinate. An example of an esterification reaction with succinate reacting with methanol to produce dimethyl succinate is shown below:

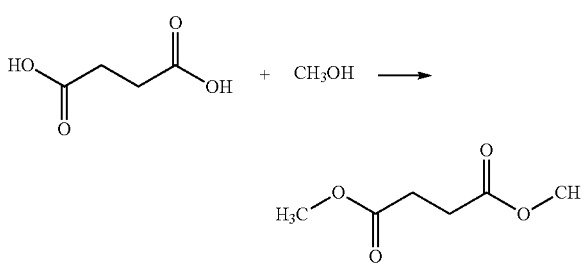

This esterification reaction can be generalized as:

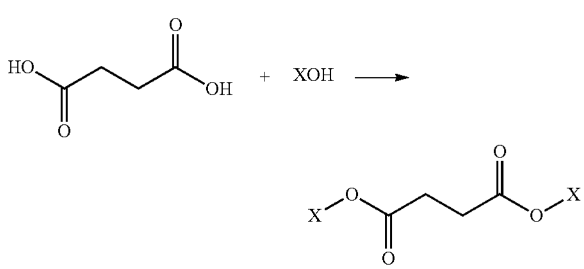

wherein X is C1-C18 linear, branched, aryl or aliphatic, or C1-C6 linear, branched, aryl or aliphatic; wherein X can be interrupted by a heteroatom (O, N, S, or P) or uninterrupted.

As another example, succinate can be reacted with an amine (such as ammonia or a primary or secondary amine) to form an amide or an imide. An example of succinate reacting with ammonia to produce succinimide is shown below:

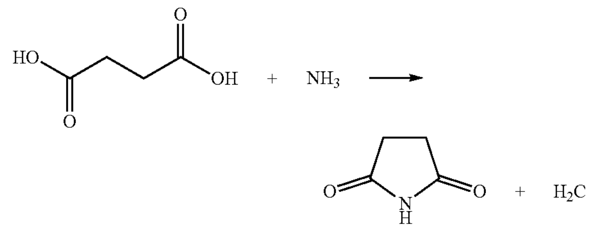

As another example, succinate can be reacted with an excess of an anhydride to form a bis-anhydride or with a fluorinated species to form a fluorinated bis-anhydride. An example of succinate reacting with trifluoroacetic acid anhydride to produce a bis-anhydride is shown below:

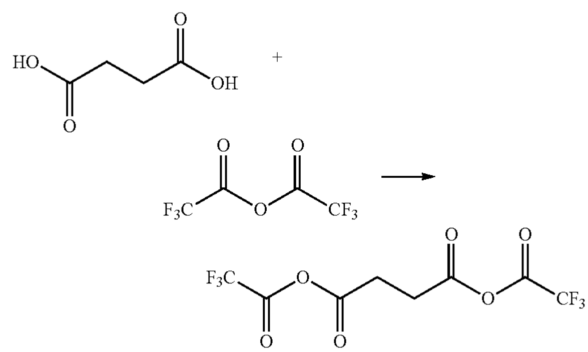

In some embodiments, conversion of succinate to a compound with a higher vapor pressure can proceed through various steps. By way of example, in some embodiments, the method can include converting the carboxylic acid groups of succinate into a more reactive group using a separate reagent prior to reaction of the breath sample with the reagent. In some embodiments the reaction (and reagents thereof) to generate a more reactive group may be temporally and/or physically separated from the reaction (and reagents thereof) to generate a reaction product with a higher vapor pressure. However, in some embodiments, a mixture of breath, an activating reagent, and the final reagent may be present with the succinate simply reacting first with the activating reagent followed by reaction with the final reagent (e.g., the reagents need not be physically and/or temporally separated from one another in some embodiments). Various compounds can be used to convert succinate (succinic acid) into a more reactive species. In some embodiments, a carbodiimide reagent (including, but not limited to, dicyclohexylcarbodiimide) can be used to convert succinate into a more reactive species before converting it into a reaction product with a higher vapor pressure than the starting compound.

Regardless, reaction products can include those that have a vapor pressure that is higher than for succinate. Reaction products can include those having a vapor pressure that is higher than $1.91\times10^{-7}$ mmHg (at 25° C.), $1\times10^{-6}$ mmHg (at 25° C.), $1\times10^{-5}$ mmHg (at 25° C.), $1\times10^{-4}$ mmHg (at 25°

C.), $1\times10^{-3}$ mmHg (at 25° C.), $1\times10^{-2}$ mmHg (at 25° C.), $1\times10^{-1}$ mmHg (at 25° C.), 1 mmHg (at 25° C.), or 10 mmHg (at 25° C.), or an amount falling within a range between any of the foregoing.

Various configurations for chemical sensor elements are contemplated herein. Referring now to FIG. 7, a schematic top plan view of a chemical sensor element 700 is shown in accordance with various embodiments herein. The chemical sensor element 700 can include a substrate 702. It will be appreciated that the substrate can be formed from many different materials. By way of example, the substrate can be formed from polymers, metals, glasses, ceramics, cellulosic materials, composites, metal oxides, and the like. The thickness of the substrate can vary. In some embodiments, the substrate has sufficient structural integrity to be handled without undue flexure that could damage components thereon. In some embodiments, the substrate can have a thickness of about 0.05 mm to about 5 mm. The length and width of the substrate can also vary. In some embodiments, the length (or major axis) can be from about 0.2 cm to about 10 cm. In some embodiments, the width (perpendicular to the major axis) can be from about 0.2 cm to about 8 cm. In some embodiments, the chemical sensor element can be disposable. In some embodiments, the chemical sensor element can be reusable.

The chemical sensor element can include a first measurement zone 704 disposed on the substrate 702. In some embodiments, the first measurement zone 704 can define a portion of a first gas flow path. The first measurement zone (or breath sample zone) 704 can include a plurality of discrete graphene varactors that can sense analytes in a gaseous sample, such as a breath sample. A second measurement zone (or environment sample zone), separate from the first measurement zone 704, can also be disposed on the substrate 702. The second measurement zone 706 can also include a plurality of discrete graphene varactors. In some embodiments, the second measurement zone 706 can include the same (in type and/or number) discrete graphene varactors that are within the first measurement zone 704. In some embodiments, the second measurement zone 706 can include only a subset of the discrete graphene varactors that are within the first measurement zone 704. In operation, the data gathered from the first measurement zone, which can be reflective of the gaseous sample analyzed, can be corrected or normalized based on the data gathered from the second measurement zone, which can be reflective of analytes present in the environment. However, in some embodiments, both a first and second measurement zone can reflect the breath sample analyzed. In some embodiments, a second measurement zone is not included.

In some embodiments, a third measurement zone (drift control or witness zone) 708 can also be disposed on the substrate. The third measurement zone 708 can include a plurality of discrete graphene varactors. In some embodiments, the third measurement zone 708 can include the same (in type and/or number) discrete graphene varactors that are within the first measurement zone 704. In some embodiments, the third measurement zone 708 can include only a subset of the discrete graphene varactors that are within the first measurement zone 704. In some embodiments, the third measurement zone 708 can include discrete graphene varactors that are different than those of the first measurement zone 704 and the second measurement zone 706. In some embodiments, a third measurement zone 708 is not included. Aspects of the third measurement zone are described in greater detail below.

The first measurement zone, the second measurement zone, and the third measurement zone can be the same size or can be of different sizes. In some embodiments, the chemical sensor element 700 can also include a component 710 to store reference data. The component 710 to store reference data can be an electronic data storage device, an optical data storage device, a printed data storage device (such as a printed code), or the like. The reference data can include, but is not limited to, data regarding the third measurement zone.

In some embodiments, chemical sensor elements embodied herein can include electrical contacts (not shown) that can be used to provide power to components on the chemical sensor element 700 and/or can be used to read data regarding the measurement zones and/or data from the stored in component 710. However, in other embodiments there are no external electrical contacts on the chemical sensor element 700. Further aspects of exemplary chemical sensor elements can be found in U.S. application Ser. No. 14/883,895, the content of which is herein incorporated by reference in its entirety.

Many different types of circuits can be used to gather data from chemical sensor elements. It will be appreciated that the chemical sensor elements embodied herein can include those that are compatible with passive wireless sensing techniques. One example of a passive sensor circuit 1102 and a portion of a reading circuit 1122 is illustrated schematically in FIG. 11 and discussed in more detail below, however, many other circuits are contemplated herein.

Figure 8:
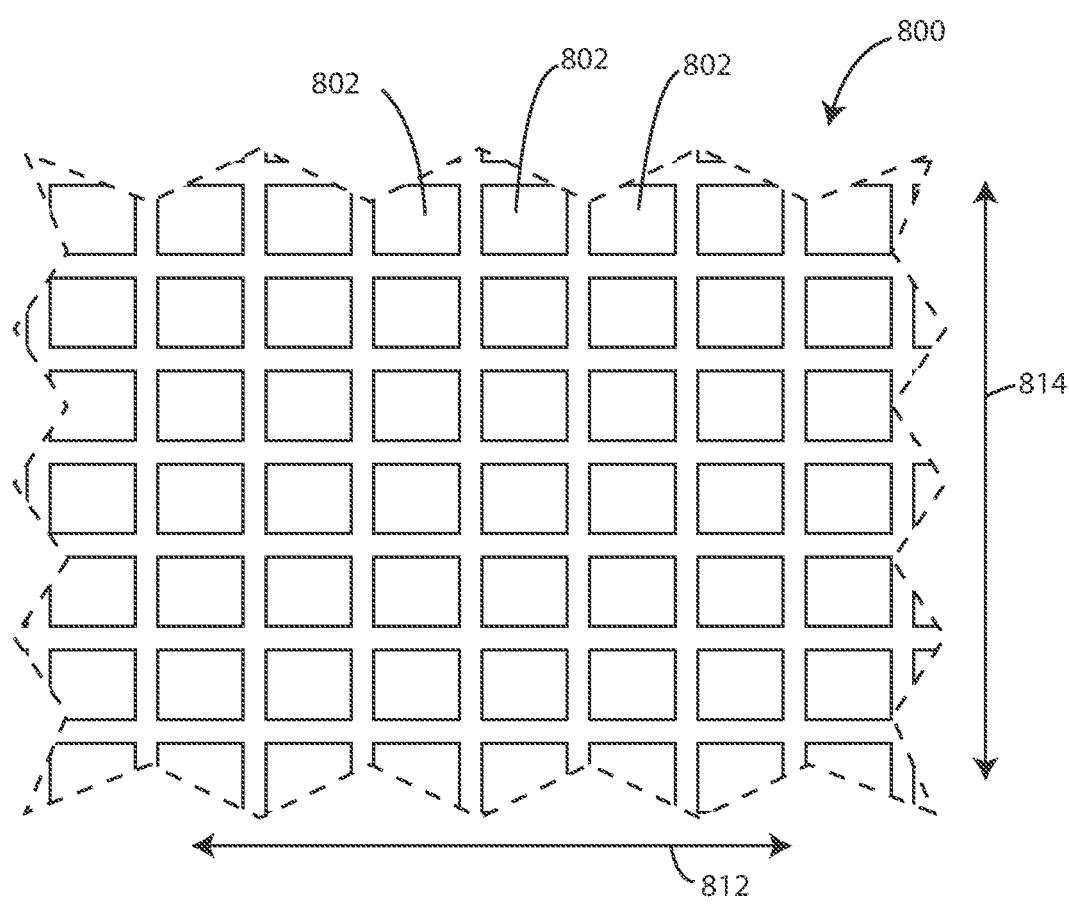
FIG. 8 is a schematic diagram of a portion of a measurement zone in accordance with various embodiments herein.

Referring now to FIG. 8, a schematic diagram of a portion of a measurement zone 800 is shown in accordance with various embodiments herein. A plurality of discrete graphene varactors 802 can be disposed within the measurement zone 800 in an array. In some embodiments, a chemical sensor element can include a plurality of discrete graphene varactors configured in an array within a measurement zone. In some embodiments, the plurality of discrete graphene varactors can be identical, while in other embodiments the plurality of discrete graphene varactors can be different from one another. The discrete graphene varactors herein are described in more detail in U.S. Publ. Appl. No. 2014/0145735, which is herein incorporated by reference in its entirety.

In some embodiments, the discrete graphene varactors can be heterogeneous in that they are all different from one another in terms of their binding behavior or specificity with regard a particular analyte. In some embodiments, some discrete graphene varactors can be duplicated for validation purposes but are otherwise heterogeneous from other discrete graphene varactors. Yet in other embodiments, the discrete graphene varactors can be homogeneous. While the discrete graphene varactors 802 of FIG. 8 are shown as boxes organized into a grid, it will be appreciated that the discrete graphene varactors can take on many different shapes (including, but not limited to, various polygons, circles, ovals, irregular shapes, and the like) and, in turn, the groups of discrete graphene varactors can be arranged into many different patterns (including, but not limited to, star patterns, zig-zag patterns, radial patterns, symbolic patterns, and the like).

In some embodiments, the order of specific discrete graphene varactors 802 across the length 812 and width 814 of the measurement zone can be substantially random. In other embodiments, the order can be specific. For example, in some embodiments, a measurement zone can be ordered so that the specific discrete graphene varactors 802 for analytes having a lower molecular weight are located farther away from the incoming gas flow relative to specific discrete graphene varactors 802 for analytes having a higher molecular weight which are located closer to the incoming gas flow. As such, chromatographic effects which may serve to provide separation between chemical compounds of different molecular weight can be taken advantage of to provide for optimal binding of chemical compounds to corresponding discrete graphene varactors.

The number of discrete graphene varactors within a particular measurement zone can be from about 1 to about 100,000. In some embodiments, the number of discrete graphene varactors can be from about 1 to about 10,000. In some embodiments, the number of discrete graphene varactors can be from about 1 to about 1,000. In some embodiments, the number of discrete graphene varactors can be from about 2 to about 500. In some embodiments, the number of discrete graphene varactors can be from about 10 to about 500. In some embodiments, the number of discrete graphene varactors can be from about 50 to about 500. In some embodiments, the number of discrete graphene varactors can be from about 1 to about 250. In some embodiments, the number of discrete graphene varactors can be from about 1 to about 50.

Each of the discrete graphene varactors suitable for use herein can include at least a portion of one or more electrical circuits. By way of example, in some embodiments, each of the discrete graphene varactors can include one or more passive electrical circuits. In some embodiments, the graphene varactors can be included such that they are integrated directly on an electronic circuit. In some embodiments, the graphene varactors can be included such that they are wafer bonded to the circuit. In some embodiments, the graphene varactors can include integrated readout electronics, such as a readout integrated circuit (ROIC). The electrical properties of the electrical circuit, including resistance or capacitance, can change upon binding, such as specific and/or non-specific binding, with a component from a breath sample.

Figure 9:
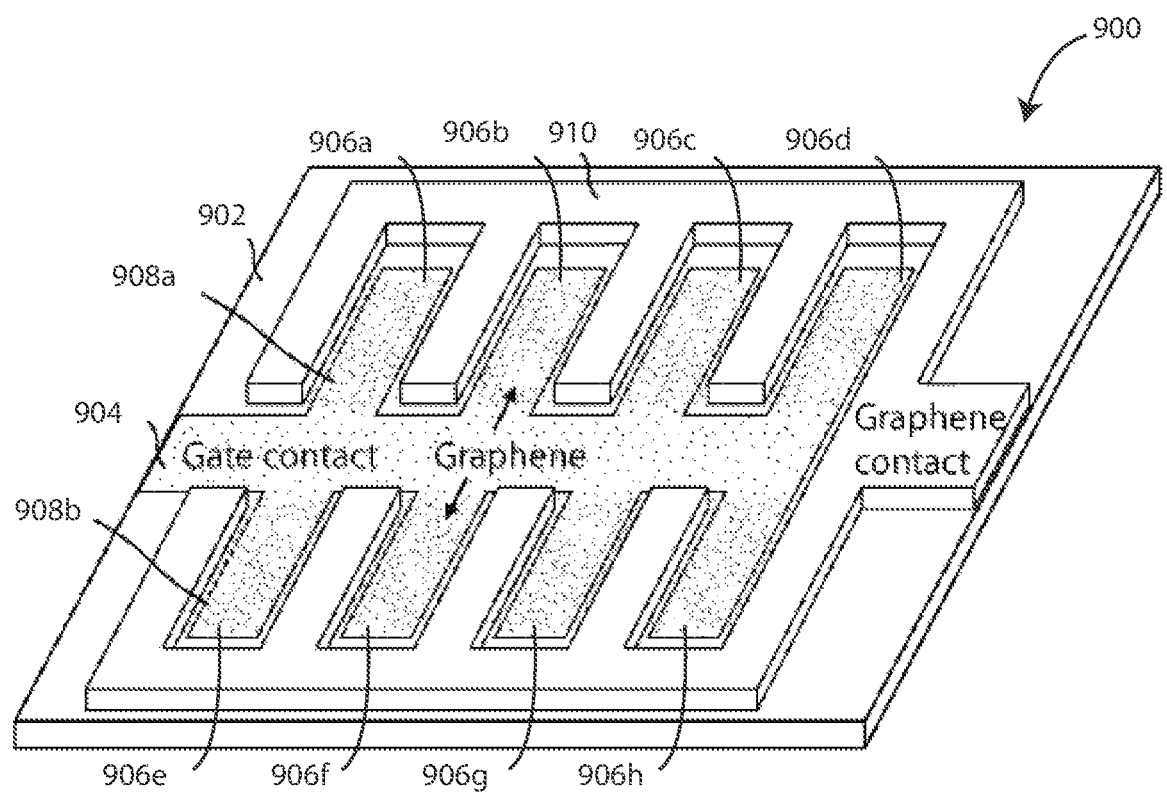
FIG. 9 is a schematic perspective view of a graphene varactor in accordance with various embodiments herein.

In some embodiments, the discrete graphene varactors embodied herein can include graphene-based variable capacitors (or graphene varactors). Referring now to FIG. 9, a schematic view of a graphene varactor 900 is shown in accordance with the embodiments herein. It will be appreciated that graphene varactors can be prepared in various ways with various geometries, and that the graphene varactor shown in FIG. 9 is just one example in accordance with the embodiments herein.

Graphene varactor 900 can include an insulator layer 902, a gate electrode 904 (or "gate contact"), a dielectric layer (not shown in FIG. 9), one or more graphene layers, such as graphene layers 908a and 908b, and a contact electrode 910 (or "graphene contact"). In some embodiments, the graphene layer(s) 908a-b can be contiguous, while in other embodiments the graphene layer(s) 908a-b can be non-contiguous. Gate electrode 904 can be deposited within one or more depressions formed in insulator layer 902. Insulator layer 902 can be formed from an insulative material such as silicon dioxide, formed on a silicon substrate (wafer), and the like. Gate electrode 904 can be formed by an electrically conductive material such as chromium, copper, gold, silver, tungsten, aluminum, titanium, palladium, platinum, iridium, and any combinations or alloys thereof, which can be deposited on top of or embedded within the insulator layer 902. The dielectric layer can be disposed on a surface of the insulator layer 902 and the gate electrode 904. The graphene layer(s) 908a-b can be disposed on the dielectric layer.

Graphene varactor 900 includes eight gate electrode fingers 906a-906h. It will be appreciated that while graphene varactor 900 shows eight gate electrode fingers 906a-906h, any number of gate electrode finger configurations can be contemplated. In some embodiments, an individual graphene varactor can include fewer than eight gate electrode fingers. In some embodiments, an individual graphene varactor can include more than eight gate electrode fingers. In other embodiments, an individual graphene varactor can include two gate electrode fingers. In some embodiments, an individual graphene varactor can include 1, 2, 3, 4, 5, 6, 7, 8, 9, 10, or more gate electrode fingers.

Graphene varactor 900 can include one or more contact electrodes 910 disposed on portions of the graphene layers 908a and 908b. Contact electrode 910 can be formed from an electrically conductive material such as chromium, copper, gold, silver, tungsten, aluminum, titanium, palladium, platinum, iridium, and any combinations or alloys thereof. Further aspects of exemplary graphene varactors can be found in U.S. Pat. No. 9,513,244, the content of which is herein incorporated by reference in its entirety.

The capacitance of the graphene varactors can be measured by delivering an excitation current at a particular voltage and/or over a range of voltages. Measuring the capacitance provides data that reflects the binding status of analytes to the graphene varactor(s). Various measurement circuitry can be used to measure the capacitance of the graphene varactor(s).

Figure 10:
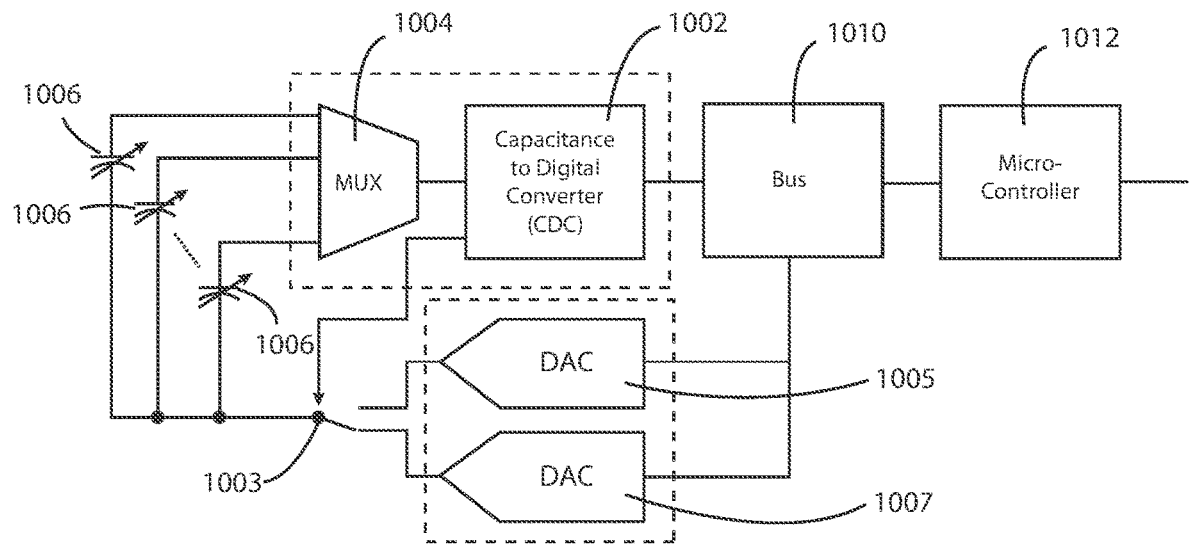
FIG. 10 is a schematic diagram of circuitry to measure the capacitance of a plurality of graphene sensors in accordance with various embodiments herein

Referring now to FIG. 10, a schematic diagram is shown of circuitry to measure the capacitance of a plurality of graphene sensors in accordance with various embodiments herein. The circuitry can include a capacitance to digital converter (CDC) 1002 in electrical communication with a multiplexor 1004. The multiplexor 1004 can provide selective electrical communication with a plurality of graphene varactors 1006. The connection to the other side of the graphene varactors 1006 can be controlled by a switch 1003 (as controlled by the CDC) and can provide selective electrical communication with a first digital to analog converter (DAC) 1005 and a second digital to analog converter (DAC) 1006. The other side of the DACs 1005, 1007 can be connected to a bus device 1010, or in some cases, the CDC 1002. The circuitry can further include a microcontroller 1012, which will be discussed in more detail below.

In this case, the excitation signal from the CDC controls the switch between the output voltages of the two programmable Digital to Analog Converters (DACs). The programmed voltage difference between the DACs determines the excitation amplitude, providing an additional programmable scale factor to the measurement and allowing measurement of a wider range of capacitances than specified by the CDC. The bias voltage at which the capacitance is measured is equal to the difference between the bias voltage at the CDC input (via the multiplexor, usually equal to VCC/2, where VCC is the supply voltage) and the average voltage of the excitation signal, which is programmable. In some embodiments, buffer amplifiers and/or bypass capacitance can be used at the DAC outputs to maintain stable voltages during switching. Many different ranges of DC bias voltages can be used. In some embodiments, the range of DC bias voltages can be from −3 V to 3 V, or from −1 V to 1 V, or from −0.5 V to 0.5 V.

Many different aspects can be calculated based on the capacitance data. For example, aspects that can be calculated include maximum slope of capacitance to voltage, change in maximum slope of capacitance to voltage over a baseline value, minimum slope of capacitance to voltage, change in minimum slope of capacitance to voltage over a baseline value, minimum capacitance, change in minimum capacitance over a baseline value, voltage at minimum capacitance (Dirac point), change in voltage at minimum capacitance, maximum capacitance, change in maximum capacitance, ratio of maximum capacitance to minimum capacitance, response time constants, and ratios of any of the foregoing between different graphene sensors and particularly between different graphene sensors having specificity for different analytes.

The above calculated aspects can be used for various diagnostic purposes. In some cases, the above calculated aspects can be indicative of the identity and/or concentrations of specific volatile organic components of a gas sample. As such, each of the calculated values above can serve as a distinct piece of data that forms part of a pattern for a given subject and/or given gas sample. As also described elsewhere herein, the pattern can then be matched against preexisting patterns, or patterns identified in real-time, derived from large stored data sets through techniques such as machine learning or other techniques, wherein such patterns are determined to be characteristic of various conditions or disease states. The above calculated aspects can also be put to other purposes, diagnostic and otherwise.

In some embodiments, calculations such as those described above can be performed by a controller circuit. The controller circuit can be configured to receive an electrical signal reflecting the capacitance of the graphene varactors. In some embodiments, the controller circuit can include a microcontroller to perform these calculations. In some embodiments, the controller circuit can include a microprocessor in electrical communication with the measurement circuit. The microprocessor system can include components such as an address bus, a data bus, a control bus, a clock, a CPU, a processing device, an address decoder, RAM, ROM and the like. In some embodiments, the controller circuit can include a calculation circuit (such as an application specific integrated circuit-ASIC) in electrical communication with the measurement circuit.

In addition, in some embodiments, the system can include a nonvolatile memory where sensitivity calibration information for the particular sensor is stored. By way of example, the sensor could be tested in a production facility, where its sensitivity to various analytes such as organic compounds (including, but not limited to, volatile organic compounds) can be determined and then stored on an EPROM or similar component. In addition, or alternatively, sensitivity calibration information can be stored in a central database and referenced with a sensor serial number when subject data is sent to a central location for analysis. These components can be included with any of the pieces of hardware described herein.

In some embodiments herein, components can be configured to communicate over a network, such as the internet or a similar network. In various embodiments, a central storage and data processing facility can be included. In some embodiments, data gathered from sensors in the presence of the subject (local) can be sent to the central processing facility (remote) via the internet or a similar network, and the pattern from the particular subject being evaluated can be compared to those of thousands or millions of other subjects, many of whom have been previously diagnosed with various conditions and wherein such condition data has been stored. Pattern matching algorithms can be used to find other subjects or classes of subjects (for example disease or condition specific classes) to which the current subject's pattern is most similar. Each class of subjects can include a predetermined likelihood of having a given condition or disease state. In this manner, after pattern matching a likelihood of having a given condition or disease state can be provided back across the data network to the facility where the subject is currently located.

In some embodiments, circuitry can include active and passive sensing circuits. Such circuitry can implement wired (direct electrical contact) or wireless sensing techniques.

Figure 11:
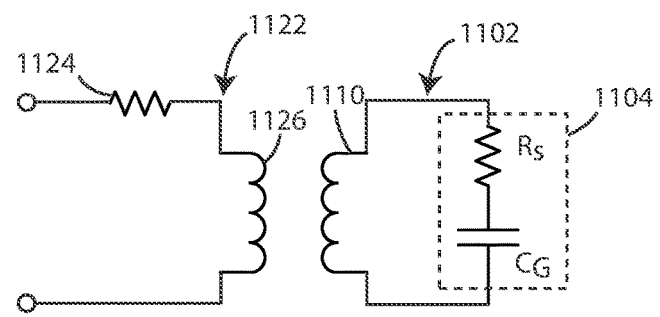
FIG. 11 is a circuit diagram of a passive sensor circuit and a portion of a reading circuit is shown in accordance with various embodiments herein.

The breath sensing systems described herein can include various types of circuitry for generating signals from the discrete graphene varactors. Such circuitry can include active and passive sensing circuits. Such circuitry can implement wired (direct electrical contact) or wireless sensing techniques. Referring now to FIG. 11, a schematic diagram of a passive sensor circuit 1102 and a portion of a reading circuit 1122 is shown in accordance with various aspects herein. In some embodiments, the passive sensor circuit 1102 can include a metal-oxide-graphene varactor 1104 (wherein RS represents the series resistance and CG represents the varactor capacitor) coupled to an inductor 1110. In some embodiments, the reading circuit 1122 can include a reading coil having a resistance 1124 and an inductance 1126. However, it will be appreciated that the circuits shown in FIGS. 10 and 11 are merely exemplary approaches. Many different approaches are contemplated herein. Additional systems and methods for analyte sensing in physiological gas samples are described in co-pending U.S. App. No. 62/533,916, which is herein incorporated by reference in its entirety.

Figure 12:
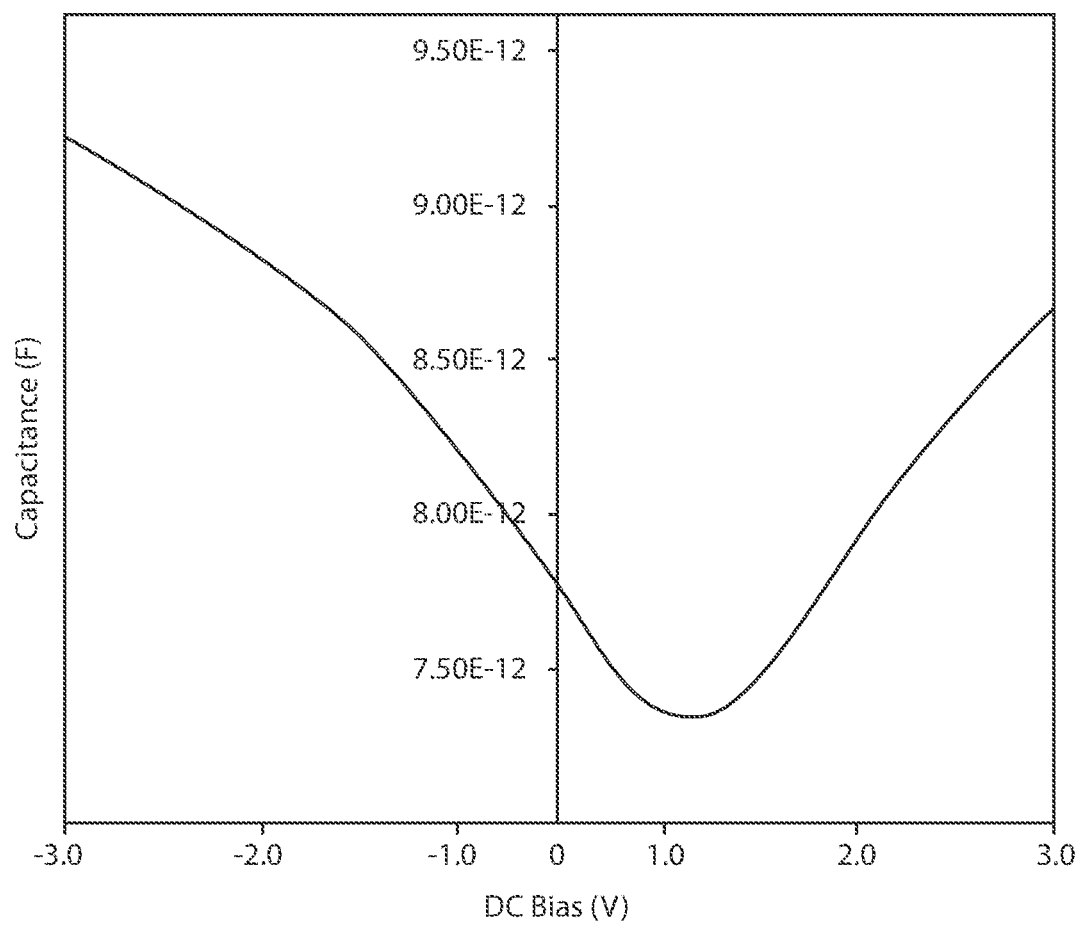
FIG. 12 is a graph showing capacitance versus DC bias voltage for a graphene varactor in accordance with various embodiments herein.

Referring now to FIG. 12 a graph showing capacitance versus DC bias voltage for a graphene varactor is shown in accordance with various embodiments herein. A capacitance to voltage curve like that shown in FIG. 12 can be established by measuring capacitance over a range of bias voltages while exposing the chemical sensor to the exhaled breath of a subject using an LCR meter. In some embodiments, the range of bias voltages can include from −3 V to 3 V. In some embodiments, the range of DC bias voltages can be from −2 V to 2 V, or from −1.5 V to 1.5 V, or from −1 V to 1 V, or from −0.5 V to 0.5 V.

Classification and Pattern Matching

In various embodiments, the capacitance of the discrete graphene varactors can be sensed and stored to obtain a sample data set. The sample data set can then be classified into one or more preestablished hemorrhage classifications. However, in various embodiments, the sample data set used for classification can include additional data regarding the subject beyond sensed capacitance. For example, the sample data set can include information regarding preexisting medical conditions the patient may have (such as hemophilia, leukemia, liver disease, menorrhagia, thrombocytopenia, von Willebrand disease, vitamin K deficiency, lung cancer, and the like). The sample data set can also include information regarding therapeutic treatments used (currently or recently) by or on the subject (such as surgical or other medical procedures, blood-thinning medications, anti-clotting medications, long-term antibiotic use, radiation therapy, aspirin, and the like). Other pieces of data in the data set for classification can include gender, age, weight, known medical history items, and the like. Other piece of data in the data set for classification can include pulse rate (beats/min), respiratory rate (breaths/min), urine output (ml/hour), blood lactate concentration, injury severity score (or similar illness severity score), APACHE-II score (the APACHE-II score provides an estimate of ICU mortality based on a number of laboratory values and patient signs taking both acute and chronic disease into account), Glasgow Coma score, and CNS symptoms.

In some embodiments, the patient's systolic blood pressure can be sensed and the systolic blood pressure can form part of the sample data set for classification. In some embodiments, threshold amounts and whether or not measured systolic blood pressure falls above or below a threshold amount can be used as part of a sample data set. For example, whether the patient's systolic blood pressure is less than 90 can be sensed and can be used as part of a sample data set for classification.

In some embodiments, additional data used for classification can include at least one of prior traumatic injuries of the subject, the time elapsed since a traumatic injury to the subject, age of the subject, and symptoms experienced by the subject.

Various treatment decisions can be decided based on the sample data set and which classification it fits in. For example, in some embodiments, the sample data set is further analyzed to identify if the subject is a candidate for immediate fluid infusion and/or transport to a surgical facility.

Classifying the sample data set into one or more preestablished condition classifications (hemorrhage, hypoxic state, or the like) can be performed according to many different machine learning techniques, such as pattern recognition. Classification can include comparing the sample data set against one or more previously determined patterns using a pattern matching or pattern recognition algorithm to determine the pattern that is the best match, wherein the specific previously determined pattern that is the best match indicates the condition (hemorrhage, hypoxic state, or the like) of the patient.

By way of example, patterns amongst large sets of patient data may be originally identified through machine learning analysis or another similar algorithmic technique. Patterns associated with specific condition classifications can be derived from labeled "training" data (supervised learning) or in the absence of labeled data (unsupervised learning).

Algorithms for pattern matching used herein can include, but are not limited to, classification algorithms (supervised algorithms predicting categorical labels), clustering algorithms (unsupervised algorithms predicting categorical labels), ensemble learning algorithms (supervised meta-algorithms for combining multiple learning algorithms together), general algorithms for predicting arbitrarily-structured sets of labels, multilinear subspace learning algorithms (predicting labels of multidimensional data using tensor representations), real-valued sequence labeling algorithms (predicting sequences of real-valued labels), regression algorithms (predicting real-valued labels), and sequence labeling algorithms (predicting sequences of categorical labels).

Classification algorithms can include parametric algorithms (such as linear discriminant analysis, quadratic discriminant analysis, and maximum entropy classifier) and nonparametric algorithms (such as decision trees, kernel estimation, naïve Bayes classifier, neural networks, perceptrons, and support vector machines). Clustering algorithms can include categorical mixture models, deep learning methods, hierarchical clustering, K-means clustering, correlation clustering, and kernel principal component analysis. Ensemble learning algorithms can include boosting, bootstrap aggregating, ensemble averaging, and mixture of experts. General algorithms for predicting arbitrarily-structured sets of labels can include Bayesian networks and Markov random fields. Multilinear subspace learning algorithms can include multilinear principal component analysis (MPCA). Real-valued sequence labeling algorithms can include Kalman filters and particle filters. Regression algorithms can include both supervised (such as Gaussian process regression, linear regression, neural networks and deep learning methods) and unsupervised (such as independent component analysis and principal components analysis) approaches. Sequence labeling algorithms can include both supervised (such as conditional random fields, hidden Markov models, maximum entropy Markov models, and recurrent neural networks) and unsupervised (hidden Markov models and dynamic time warping) approaches.

Many different classifications can be used for the conditions discussed herein. Classifications herein can include, but are not limited to, degrees of a given condition (such as non-existent vs. mild vs. severe). Classifications herein can include, but are not limited to, probabilities that a given condition is present (such as no indication vs. low probability vs high probability).

Normal blood concentrations of succinate (in patients without hemorrhage) are from about 5 µM to about 32 µM. See Magera et al., *Methylmalonic acid measured in plasma and urine by stable-isotope dilution and electrospray tandem mass spectrometry*, Clin Chem. 2000 November; 46(11):1804-10. One set of exemplary hemorrhage classifications based on succinate concentrations are described in Table 1 below.

TABLE 1

| Hemorrhage Classification | Succinate Concentrations |
| --- | --- |
| Mild Hemorrhage | >32 µM and <0.1 mM |
| Moderate Hemorrhage | 0.1 mM to 0.65 mM |
| Severe Hemorrhage | >0.65 mM |

It will be appreciated that the ranges shown in TABLE 1 above are merely illustrative of one example of ranges that can be used for hemorrhage classification herein and that specific values may change in various scenarios. In some embodiments, classification herein can be simply binary (treatment for hemorrhage indicated vs. no treatment indicated) with a threshold value (for succinate or another analyte) for classification being 0.05 mM, 0.075 mM, 0.1 mM, 0.125 mM, 0.15 mM, 0.2 mM, 0.3 mM, 0.4 mM, 0.5 mM, 0.6 mM, 0.7 mM, 0.8 mM, 1 mM, 1.25 mM, 1.5 mM, 1.75 mM, 2 mM, 3 mM, 5 mM, 10 mM, 15 mM, 20 mM, 25 mM, 30 mM, 35 mM, 40 mM, 50 mM or higher, or an amount falling within a range between any of the foregoing.

Methods

Many different methods are contemplated herein, including, but not limited to, methods of making, methods of using, methods of treating, and the like. Aspects of system/device operation described elsewhere herein can be performed as operations of one or more methods in accordance with various embodiments herein.

In an embodiment, a method for detecting hemorrhage in a patient, is included, the method obtaining a breath sample from the subject and contacting it with a chemical sensor element, the chemical sensor element can include a plurality of discrete graphene varactors; sensing and storing capacitance of the discrete graphene varactors to obtain a sample data set; and classifying the sample data set into one or more preestablished hemorrhage classifications.

In an embodiment of the method, the preestablished hemorrhage classifications include Class I, Class II, Class III, and Class IV hemorrhage. Classes of hemorrhage are described in Table 2 below.

TABLE 2

| Parameter | HEMORRHAGE CLASS | | | |
|---|---|---|---|---|
| | I | II | III | IV |
| Blood loss (ml) | <750 | 750-1500 | 1500-2000 | >2000 |
| Blood loss (%) | <15% | 15-30% | 30-40% | >40% |
| Pulse rate (beats/min) | <100 | >100 | >120 | >140 |
| Blood pressure | Normal | Decreased | Decreased | Decreased |
| Respiratory Rate (breaths/min) | 14-20 | 20-30 | 30-40 | >35 |
| Urine Output (ml/hour) | >30 | 20-30 | 5-15 | Negligible |
| CNS Symptoms | Normal | Anxious | Confused | Lethargic |

In an embodiment of the method, the patient is a trauma patient.

In an embodiment of the method, the method can include obtaining a breath sample from the subject comprises obtaining a breath sample at least two times over a period of at least 10 minutes.

In an embodiment of the method, the sample data set is further analyzed to determine an improvement or a worsening in the degree of hemorrhage.

In an embodiment of the method, sensing and storing capacitance of the graphene varactors to obtain a sample data set is performed across a range of bias voltages.

In an embodiment of the method, the bias voltage is from −3 V to 3 V.

In an embodiment of the method, at least 10 discrete capacitance values are stored for each graphene varactor across the range of bias voltages.

In an embodiment of the method, organic compounds from the exhaled breath sample interface with the discrete graphene varactors to influence sensed capacitance.

In an embodiment of the method, volatile organic compounds (VOCs) from the exhaled breath sample interface with the discrete graphene varactors to influence sensed capacitance.

In an embodiment of the method, a citric acid cycle compound from the exhaled breath sample interfaces with the discrete graphene varactors to influence sensed capacitance.

In an embodiment of the method, succinate from the exhaled breath sample interfaces with the discrete graphene varactors to influence sensed capacitance.

In an embodiment of the method, reaction products of succinate and one or more reagents interface with the discrete graphene varactors to influence sensed capacitance.

In an embodiment, further storing additional data regarding the subject beyond sensed capacitance as part of the sample data set that is classified.

In an embodiment, the method can further include sensing the patient's systolic blood pressure, wherein the systolic blood pressure forms part of the sample data set for classification. In an embodiment, the method can further include sensing whether the patient's systolic blood pressure is less than 90.

In an embodiment, the additional data can include at least one, two, three, four, five or six of: prior traumatic injuries of the subject, the time elapsed since an injury to the subject, age of the subject, symptoms experienced by the subject, heart rate, respiratory rate, blood lactate concentration, urine output, volume of blood lost, percentage of blood lost, CNS symptoms, injury severity score (or similar illness severity score), APACHE-II score, Glasgow Coma score, and the like.

In an embodiment of the method, the sample data set is further analyzed to identify if the subject is a candidate for immediate fluid infusion or transport to a surgical facility.

In an embodiment, a method for detecting hemorrhage in a patient, is included, the method obtaining a breath sample from the subject; contacting the breath sample with a reactant, wherein the reactant reacts with succinate in the breath sample to form a reaction product, wherein the reaction product exhibits greater volatility than succinate; contacting the reaction product with a chemical sensor element, the chemical sensor element can include a plurality of discrete graphene varactors; sensing and storing capacitance of the discrete graphene varactors to obtain a sample data set; and classifying the sample data set into one or more preestablished hemorrhage classifications.

In an embodiment, the method can further include heating the breath sample in the presence of the reactant.

In an embodiment, the method can further include contacting the breath sample with the reactant in the presence of a catalyst.

In an embodiment of the method, the reactant is selected from the group consisting of a C1-C18 alcohol, an amine, and an anhydride.

In an embodiment of the method, the reaction product is selected from the group consisting of an ester, an amid, an imide, and an acid anhydride.

In an embodiment, the method can further include converting carboxylic acid groups into a more reactive group using a separate reagent prior to reaction with the primary reagent.

In an embodiment, a method for detecting a state of hypoxia in a patient, is included, the method obtaining a breath sample from the subject and contacting it with a chemical sensor element, the chemical sensor element can include a plurality of discrete graphene varactors; sensing and storing capacitance of the discrete graphene varactors to obtain a sample data set; and classifying the sample data set into one or more preestablished hypoxia classifications.

Hypoxia classifications can include, but are not limited to, hypoxic hypoxia (low arterial $P_{O2}$), anemic hypoxia (decreased total amount of $O_2$ bound to hemoglobin), ischemic (or stagnant) hypoxia (reduced blood flow), and histotoxic hypoxia (failure of cells to use $O_2$ because cells have been poisoned).

Embodiments herein can specifically include methods of treating a subject, such as a traumatic injury patient, a surgical patient, a patient suffering from hemorrhage, a patient suffering from a hypoxic state, or the like. The method can include obtaining an exhaled breath sample from a subject and contacting it with a chemical sensor element, the chemical sensor element comprising a plurality of discrete graphene varactors. The method can include sensing and storing capacitance of the discrete graphene varactors to obtain a sample data set. The method can include classifying the sample data set into one or more preestablished hemorrhage classifications. The method can include comparing and/or correlating the chemical sensor element response (and particularly a chemical sensor element response related to succinate levels) to preestablished hemorrhage classifications. In an embodiment of the method, treatment includes immediate fluid infusion. The method can further include treating the patient based on the hemorrhage classification.

By way of example, one exemplary set of classifications and corresponding possible treatments for hemorrhage are provided below in Table 3 below.

TABLE 3

| Hemorrhage Classification | Treatment Examples |
| --- | --- |
| No Indication of Hemorrhage | NA |
| Indication of Mild to Moderate Hemorrhage | Further Evaluation for Possible Surgical Therapies; Consideration for Fluid Replacement Therapies; Monitoring for Changes |
| Indication of Severe Hemorrhage | Immediate Initiation of/ Referral for Surgical Therapies; Fluid Replacement Therapies; Administration of Tissue Plasminogen Activator; Intensive Monitoring for Changes |

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A method for detecting hemorrhage in a subject, comprising:
   obtaining a breath sample from the subject;
   contacting the breath sample with a reactant, wherein the reactant reacts with succinate in the breath sample to form a reaction product, wherein the reaction product exhibits a higher vapor pressure at a given temperature than succinate;
   contacting the reaction product with a chemical sensor element, the chemical sensor element comprising a plurality of discrete graphene varactors;
   sensing and storing capacitance of the discrete graphene varactors to obtain a sample data set; and
   classifying the sample data set into one or more preestablished hemorrhage classifications based on succinate concentrations.

2. The method of claim 1, further comprising heating the breath sample in the presence of the reactant.

3. The method of claim 1, further comprising contacting the breath sample with the reactant in the presence of a catalyst.

4. The method of claim 1, wherein the reactant is selected from a group consisting of a C1-C18 alcohol, an amine, and an anhydride, and the reaction product is selected from a group consisting of an ester, an amide, an imide, and an acid anhydride.

5. The method of claim 1, further comprising converting carboxylic acid groups into a more reactive group using a separate reagent prior to reaction with the reactant.

6. The method of claim 1, wherein the preestablished hemorrhage classifications include Class I, Class II, Class III, and Class IV hemorrhage.

7. The method of claim 1, wherein the subject is at least one of a trauma patient and a surgical patient.

8. The method of claim 1, wherein obtaining a breath sample from the subject comprises obtaining a breath sample at least two times over a period of at least 10 minutes and the sample data set is further analyzed to determine an improvement or a worsening in degree of hemorrhage.

9. The method of claim 1, wherein sensing and storing capacitance of the graphene varactors to obtain a sample data set is performed across a range of bias voltages.

10. The method of claim 1, further storing additional data regarding the subject beyond sensed capacitance as part of the sample data set that is classified.

11. The method of claim 10, further comprising sensing the subject's systolic blood pressure, wherein the subject's systolic blood pressure forms part of the sample data set for classification.

12. The method of claim 10, the additional data comprising at least one of:
   prior traumatic injuries of the subject;
   time elapsed since an injury to the subject;
   age of the subject;
   symptoms experienced by the subject;
   heart rate;
   respiratory rate;
   blood lactate concentration;
   urine output;
   volume of blood lost;
   percentage of blood lost;
   CNS symptoms;
   injury severity score;
   APACHE-II score; and
   Glasgow Coma score.

13. The method of claim 1, wherein the sample data set is further analyzed to identify if the subject is a candidate for immediate fluid infusion or transport to a surgical facility.

14. The method of claim 1, wherein the breath sample is contacted with the reactant in a first area.

15. The method of claim 14, wherein the chemical sensor element is contacted with the reaction product in a second area.

16. The method of claim 1, wherein the reaction product exhibits a vapor pressure higher than $1.91 \times 10^{-7}$ mmHg.

17. The method of claim 1, wherein the reaction product is selected from a group consisting of dimethyl succinate, succinimide, and bis-anhydride.

* * * * *